US007516182B2

(12) United States Patent  (10) Patent No.: US 7,516,182 B2
Goldman  (45) Date of Patent: Apr. 7, 2009

(54) PRACTICAL TECHNIQUES FOR REDUCING UNSOLICITED ELECTRONIC MESSAGES BY IDENTIFYING SENDER'S ADDRESSES

(75) Inventor: Phillip Y. Goldman, Los Altos, CA (US)

(73) Assignee: AOL LLC, Dulles, VA (US)

( * ) Notice: Subject to any disclaimer, the term of this patent is extended or adjusted under 35 U.S.C. 154(b) by 717 days.

(21) Appl. No.: 10/174,561

(22) Filed: Jun. 18, 2002

(65) Prior Publication Data

US 2003/0233418 A1    Dec. 18, 2003

(51) Int. Cl.
*G06F 15/16* (2006.01)
(52) U.S. Cl. ...................................... 709/206
(58) Field of Classification Search ................. 709/223, 709/224, 206; 713/153, 154
See application file for complete search history.

(56) References Cited

U.S. PATENT DOCUMENTS

| | | |
|---|---|---|
| 4,977,520 A | 12/1990 | McGaughey, III et al. |
| 5,040,141 A | 8/1991 | Yazima et al. |
| 5,093,918 A | 3/1992 | Heyen et al. ............... 395/725 |
| 5,159,673 A | 10/1992 | Sackmann et al. |
| 5,204,961 A | 4/1993 | Barlow |
| 5,245,532 A | 9/1993 | Mourier |
| 5,283,856 A | 2/1994 | Gross et al. |
| 5,319,776 A | 6/1994 | Hile et al. |
| 5,333,266 A | 7/1994 | Boaz et al. |
| 5,377,354 A | 12/1994 | Scannell et al. ............. 395/650 |
| 5,423,042 A | 6/1995 | Jalili et al. |
| 5,448,734 A | 9/1995 | Hrabik et al. |
| 5,471,519 A | 11/1995 | Howe et al. |
| 5,473,671 A | 12/1995 | Partridge, III |
| 5,539,828 A | 7/1996 | Davis |
| 5,548,789 A | 8/1996 | Nakanura |
| 5,600,799 A | 2/1997 | Young et al. |
| 5,604,803 A | 2/1997 | Aziz |
| 5,608,786 A | 3/1997 | Gordon |

(Continued)

FOREIGN PATENT DOCUMENTS

DE    19708856    9/1998

(Continued)

OTHER PUBLICATIONS

Chinese Abstract for CN 1117680, published Feb. 28, 1996.

(Continued)

*Primary Examiner*—Andrew Caldwell
*Assistant Examiner*—Michael D Meucci
(74) *Attorney, Agent, or Firm*—Workman Nydegger

(57) ABSTRACT

Systems and methods for managing data associated with incoming electronic messages including filtering incoming electronic messages according to the sender's address. In addition, a request/response technique categorizes sender's addresses as authorized, unauthorized, or unconfirmed, which categorizations are stored in associated data structure. The filtering processes and the categorization techniques can be used in connection with any of various methods for populating the data structures that identify sender's addresses associated with authorized and unauthorized senders. In this manner, recipients can effectively cause unsolicited electronic messages to be filtered out. Moreover, the processes generally do not require the recipient to view electronic messages and make decisions regarding whether the senders are to be categorized as unauthorized; rather, the timeliness and accuracy of the senders' responses determine whether specified senders are authorized or unauthorized.

20 Claims, 14 Drawing Sheets

U.S. PATENT DOCUMENTS

| | | | |
|---|---|---|---|
| 5,619,648 | A | 4/1997 | Canale et al. ............ 395/200.1 |
| 5,627,764 | A | 5/1997 | Schutzman et al. |
| 5,630,123 | A | 5/1997 | Hogge |
| 5,632,018 | A | 5/1997 | Otorii |
| 5,655,079 | A | 8/1997 | Hirasawa et al. |
| 5,721,779 | A | 2/1998 | Funk |
| 5,734,903 | A | 3/1998 | Saulpaugh et al. |
| 5,742,668 | A | 4/1998 | Pepe et al. |
| 5,742,769 | A | 4/1998 | Lee et al. |
| 5,781,857 | A | 7/1998 | Hwang et al. |
| 5,796,840 | A | 8/1998 | Davis ............................ 380/50 |
| 5,826,022 | A | 10/1998 | Nielsen |
| 5,832,227 | A | 11/1998 | Anderson et al. |
| 5,835,722 | A | 11/1998 | Bradshaw et al. |
| 5,859,967 | A | 1/1999 | Kaufeld et al. ............... 395/186 |
| 5,884,033 | A | 3/1999 | Duvall et al. |
| 5,893,911 | A * | 4/1999 | Piskiel et al. .................. 707/10 |
| 5,909,589 | A | 6/1999 | Parker et al. ........... 395/800.32 |
| 5,917,489 | A * | 6/1999 | Thurlow et al. .............. 715/809 |
| 5,930,479 | A | 7/1999 | Hall ....................... 395/800.68 |
| 5,937,162 | A | 8/1999 | Funk et al. |
| 5,999,600 | A | 12/1999 | Shin |
| 5,999,932 | A | 12/1999 | Paul ............................ 707/10 |
| 5,999,967 | A | 12/1999 | Sundsted .................... 709/206 |
| 6,014,634 | A | 1/2000 | Scroggie et al. |
| 6,023,723 | A | 2/2000 | McCormick et al. |
| 6,052,709 | A | 4/2000 | Paul ............................ 709/202 |
| 6,055,510 | A | 4/2000 | Hendrick et al. |
| 6,057,841 | A | 5/2000 | Thurlow et al. |
| 6,092,101 | A | 7/2000 | Birrell et al. ................. 709/206 |
| 6,112,227 | A * | 8/2000 | Heiner ........................ 709/203 |
| 6,154,765 | A * | 11/2000 | Hart ............................ 709/201 |
| 6,173,322 | B1 * | 1/2001 | Hu .............................. 709/224 |
| 6,182,118 | B1 * | 1/2001 | Finney et al. ................. 709/206 |
| 6,189,026 | B1 | 2/2001 | Birrell et al. ................. 709/206 |
| 6,195,698 | B1 | 2/2001 | Lillibridge et al. |
| 6,199,102 | B1 | 3/2001 | Cobb ........................ 709/206 |
| 6,199,106 | B1 | 3/2001 | Shaw et al. |
| 6,205,432 | B1 | 3/2001 | Gabbard et al. |
| 6,226,372 | B1 * | 5/2001 | Beebe et al. ................. 379/189 |
| 6,230,188 | B1 | 5/2001 | Marcus ....................... 709/206 |
| 6,237,027 | B1 | 5/2001 | Namekawa |
| 6,249,807 | B1 | 6/2001 | Shaw et al. ................. 709/206 |
| 6,266,692 | B1 | 7/2001 | Greenstein ................. 709/206 |
| 6,282,565 | B1 | 8/2001 | Shaw et al. ................. 709/206 |
| 6,349,328 | B1 | 2/2002 | Haneda et al. |
| 6,356,935 | B1 | 3/2002 | Gibbs ........................ 709/206 |
| 6,366,950 | B1 | 4/2002 | Scheussler et al. .......... 709/206 |
| 6,373,950 | B1 | 4/2002 | Rowney |
| 6,393,465 | B2 | 5/2002 | Leeds |
| 6,421,709 | B1 | 7/2002 | McCormick et al. |
| 6,457,044 | B1 | 9/2002 | IwaZaki |
| 6,460,074 | B1 | 10/2002 | Fishkin |
| 6,484,197 | B1 | 11/2002 | Donohue |
| 6,546,416 | B1 * | 4/2003 | Kirsch ........................ 709/206 |
| 6,587,550 | B2 * | 7/2003 | Council et al. ......... 379/100.08 |
| 6,625,257 | B1 | 9/2003 | Asaoka et al. |
| 6,640,301 | B1 | 10/2003 | Ng |
| 6,671,718 | B1 | 12/2003 | Meister et al. |
| 6,678,704 | B1 | 1/2004 | Bridge, Jr. et al. |
| 6,691,156 | B1 | 2/2004 | Drummond et al. |
| 6,708,205 | B2 | 3/2004 | Sheldon et al. |
| 6,748,422 | B2 | 6/2004 | Morin et al. |
| 6,868,498 | B1 * | 3/2005 | Katsikas ....................... 726/14 |
| 6,883,095 | B2 | 4/2005 | Sandhu et al. |
| 7,039,949 | B2 | 5/2006 | Cartmell et al. |
| 7,043,753 | B2 * | 5/2006 | Roddy et al. ................. 726/11 |
| 7,065,341 | B2 | 6/2006 | Kamiyama et al. |
| 7,076,533 | B1 | 7/2006 | Knox et al. |
| 7,085,925 | B2 | 8/2006 | Hanna et al. |
| 7,120,927 | B1 * | 10/2006 | Beyda et al. .................... 726/2 |
| 7,136,897 | B1 | 11/2006 | Raghunandan |
| 7,185,194 | B2 | 2/2007 | Morikawa et al. |
| 7,188,358 | B1 | 3/2007 | Hisada et al. |
| 7,263,545 | B2 | 8/2007 | Digate et al. |
| 7,346,696 | B2 | 3/2008 | Malik |
| 7,383,433 | B2 | 6/2008 | Yeager et al. |
| 2002/0042815 | A1 | 4/2002 | Salzfass et al. |
| 2002/0046099 | A1 | 4/2002 | Frengut et al. |
| 2002/0046250 | A1 | 4/2002 | Nassiri |
| 2002/0099781 | A1 | 7/2002 | Scheussler et al. |
| 2002/0107856 | A1 | 8/2002 | Scheussler et al. |
| 2002/0116641 | A1 | 8/2002 | Mastrianni |
| 2002/0147726 | A1 * | 10/2002 | Yehia et al. .................. 707/101 |
| 2002/0194308 | A1 | 12/2002 | Hall |
| 2002/0199095 | A1 | 12/2002 | Bandini et al. |
| 2003/0009698 | A1 | 1/2003 | Lindeman et al. |
| 2003/0023736 | A1 | 1/2003 | Abkemeier |
| 2003/0037103 | A1 | 2/2003 | Salmi et al. |
| 2003/0037250 | A1 * | 2/2003 | Walker et al. ............... 713/200 |
| 2003/0065926 | A1 * | 4/2003 | Schultz et al. .............. 713/188 |
| 2003/0086543 | A1 | 5/2003 | Raymond |
| 2003/0097597 | A1 | 5/2003 | Lewis |
| 2003/0110400 | A1 * | 6/2003 | Cartmell et al. ............. 713/202 |
| 2003/0163691 | A1 | 8/2003 | Johnson |
| 2003/0167311 | A1 | 9/2003 | Kirsch |
| 2003/0167402 | A1 | 9/2003 | Stolfo et al. |
| 2003/0191969 | A1 | 10/2003 | Katsikas |
| 2003/0196116 | A1 * | 10/2003 | Troutman .................... 713/201 |
| 2003/0200267 | A1 | 10/2003 | Garrigues |
| 2003/0233418 | A1 | 12/2003 | Goldman |
| 2004/0003283 | A1 | 1/2004 | Goodman et al. |
| 2004/0087300 | A1 | 5/2004 | Lewis |
| 2004/0167941 | A1 | 8/2004 | Prahlad et al. |
| 2004/0236838 | A1 | 11/2004 | Tout |
| 2005/0081059 | A1 * | 4/2005 | Bandini et al. ............... 713/201 |
| 2006/0101021 | A1 | 5/2006 | Davis et al. |
| 2006/0112165 | A9 * | 5/2006 | Tomkow et al. ............. 709/206 |
| 2006/0168048 | A1 | 7/2006 | Lyle et al. |
| 2007/0016641 | A1 | 1/2007 | Broomhall |

FOREIGN PATENT DOCUMENTS

| | | |
|---|---|---|
| EP | 0 463 252 B1 | 1/1992 |
| EP | 0 651 533 A2 | 5/1995 |
| EP | 0 686 327 B1 | 12/1995 |
| EP | 0 721 268 A2 | 7/1996 |
| EP | 0 725 523 A2 | 8/1996 |
| EP | 0 760 565 B1 | 3/1997 |
| EP | 0883271 | 12/1998 |
| WO | WO 94/06236 | 3/1994 |
| WO | WO 96/09714 | 3/1996 |
| WO | WO 96/24213 | 8/1996 |
| WO | WO 97/14234 | 4/1997 |
| WO | WO 97/20423 | 6/1997 |
| WO | WO 97/23082 | 6/1997 |
| WO | WO 97/24825 | 7/1997 |
| WO | WO 97/26709 | 7/1997 |
| WO | WO 98/37675 | 8/1998 |
| WO | WO 99/10817 | 3/1999 |
| WO | WO 01/16695 A1 | 3/2001 |
| WO | WO 02/077768 | 10/2002 |
| WO | WO 03/044617 | 5/2003 |

OTHER PUBLICATIONS

Cynthia Dwork et al, *Pricing via Processing or Combatting Junk Mail*, Technical Report CS95-20, Mathematics & Computer Science, Weizmann Institute of Science, Jul. 2002.

Noni Naor, *Verification of a Human in the Loop or Identification via the Turing Test*, Cited in All On-Line Papers, Sep. 1996.

Mihir Bellare et al., *Does Parallel Repetition Lower the Error in Computationally Sound Protocols?*, Proceedings of the 38th Symposium on Foundations of Computer Science, IEEE, 1997.

Jarret Kornblum, *Programmer Writes Spam Bomb*, CNET News.com, Aug. 6, 1997.

CNET News.com staff, *ISP: Internet Spam Provider*, CNET News.com, Feb. 18, 1997.

Andrew Leonard, *SpamBomers*, Salon Magazine + about 21st + newsletter, Sep. 1997.

Ronald F. Guilmette, *To Mung or Not to Mung*, [online], Jul. 24, 1997 [retrieved Apr. 25, 2003], retrieved from the internet http://groups.google.com/groups.

David F. Skoll, *How to make SURE a Human is Sending You Mail* [online], Nov. 17, 1996 [retrieved Apr. 28, 2003], retrieved from the internet http://groups.gogle.ca/groups.

Julian Byrne, *My Spamblock; Was: Thwarting UCE Address Culling Programs* [online], Jan. 19, 1997 [retrieved Apr. 28, 2003], retrieved from the internet http://google.com/groups.

Julian Byrne, *New Improved EZSPAM! Was: My Spamblock. . .* [online], Jan. 28, 1997 [retrieved Apr. 25, 2003], retrieved from the internet http://groups.google.com/groups.

Douglas G. Henke, *All Hail Emperor Lewis?* [online], Feb. 20, 1997 [retrieved Apr. 25, 2003], retrieved from the internet http://groups.google.com/groups.

Bob Tiptrie, *A Way to Stop Spam Messages* [online], [retrieved Apr. 25, 2003], retrieved from the internet http://groups.google.com/groups.

MailCircut.com, *MailCircut's Email HandShake Verification and Spam Filter Process*, retrieved Jun. 2, 2003, retrieved from the internet http://www.mailcircuit.com/filter.htm.

Bob Jameson, Jesse Berst's Anchor Desk, "*Filter for mail not addressed to you*", http://zdnet.com/anchordesk/talkback/talkback__35298.html, Aug. 19, 1997.

Foster, Ed, Info World Info Quote "*The Grip Line Threatening legal action may be the quickest way off a junk e-mailer's list*", http://www.infoworld.com/cgi-bin/displayArchives.pl?. . . Sep. 9, 1996, vol. 18, Issue 37.

Aguilar, Rose, CNET News.com, "*AOL fights to ban junk*", http://www.news.com/News/Item/0.43106,00.html, Sep. 6, 1996.

Michael's Stop Junk E-Mail, "*Stop Junk E-mail*", http://www.crl.com/~michaelp/stopjunkmail.html, Nov. 17, 1996.

Richardson, Tim, "Simple Notes on Internet Security and Email", http://www.tim-richardson.net/security.html, no date available.

Cole-Gomolski, Barb, ComputerWorld, "Adoption of S/MIME still lagging", http://www.computerworld.com/home/features.nsf/ . . . , May 11, 1998.

Public Access Networks Corporation, panix.com, Responding to Unsolicited Commercial Email (UCE, "email spam"), http:www.panix.com/uce.html, Feb. 25, 1997.

"Showing Full Headers of a Message", http:/www.panix.com/headers.html, no date available.

Foiling Spam with an Email Password Systems [online] retrieved on Jun. 28, 2004]. Retrieved from the Internet http://www.uwasa.fi/~ts/info/spamfoil.html (10 pages).

Article entitled "Spam!", by Lorrie Faith Cranor and Brian A. LaMacchia, Aug. 1998, Communications of the ACM, vol. 41, No. 8, pp. 74-83.

Cementing Online Partnerships and Improving User Experience, RSA Security, retrived online May 17, 2006, 7 pages, www.rsasecurity.com.

Controlling E-Mail Spam, online, retrieved on Mar. 28, 2003, 5 pages, retrieved from the Internet http://spam.abuse.net/adminhelp/mail.shtml.

Cynthia Dwork, Fighting Spam May be Easier Than You Think, 1992, 30 pages, presentation given in Crypto.

Cynthia Dwork, Fighting Spam: The Science, 2004, pp. 3-4, M. Farach-Colton (Ed.): Latin 2004, LNCS 2976, Springer-Verlag Berlin.

D.J. Berstein, Variable Envelope Return Paths, Feb. 1, 1997, 2 pages, http://cr.yp.to/proto/verp.txt.

David A. Wheeler, Countering Spam with Ham-Authenticated Email and the Guarded Email Protocol, Draft: First version Dec. 8, 2002; Released Apr. 2, 2003, 28 pages, dwheeler@dwheeler.com.

Dealing with Unsolicited Commercial Email (UCE, "email spam"), 2005 Public Access Networks Corporation, online, retrieved on Jun. 6, 2006, 3 pages, retrieved from the Internet http://www.panix.com/uce.html, Copyright 2003.

J. Klensin et al., IMAP/POP Authorized Extension for Simple Challenge/Response, Sep. 1997, 5 pages.

MIT LCS, Applied Security Reading Group, by Email Sit and Kevin Fu, 2 pages, updated May 5, 2003 on the Internet http://www.pdocs.lcs.mit.edu/asrg/.

NAGS Spam Filter, 11 pages, http://www.nags.org/spamfilter.html.

P. Resnick, RFC28822, Apr. 2001, 51 pages, Qualcom Incorporated, http:rfc.net/rfc2822.html.

Paul Hoffman et al., Unsolicited Bulk Email: Mechanisms for Control, revised May 4, 1998, 16 pages, Internet Mail Consortium Report UBE-SOL, IMCR-008.

The Penny Black Project, online, retrieved on May 8, 2006, 2 pages, retrieved from the Internet http://research.microsoft.com/research/sv/PennyBlack/.

Paul Hoffman et al., Unsolicited Bulk Email: Mechanisms for Control, Internet Mail Consortium Report UBE-SOL, IMCR-005, Oct. 13, 1997, 31 pages.

* cited by examiner

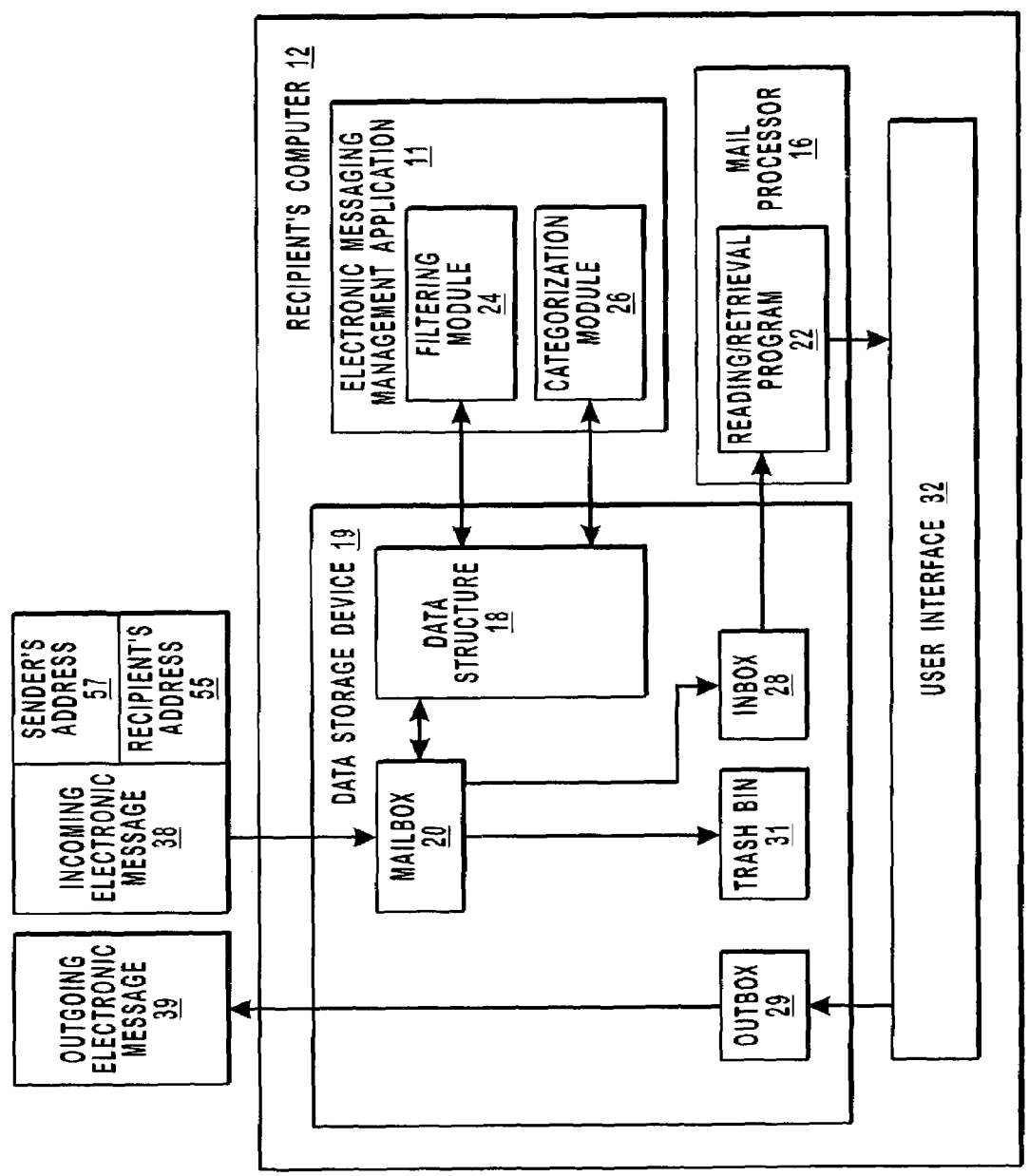

PRACTICAL TECHNIQUES FOR REDUCING UNSOLICITED ELECTRONIC MESSAGES BY IDENTIFYING SENDER'S ADDRESSES

BACKGROUND OF THE INVENTION

1. The Field of the Invention

The present invention relates generally to managing electronic messages. More specifically, the present invention relates to systems and methods for management of electronic messages to reduce the volume of unwanted electronic messages that are received by recipients.

2. Background and Relevant Art

Electronic messaging or e-mail has become, for many people, a primary means of communication. The ease by which a person is able to send and receive an electronic message makes this form of communication extremely attractive. Unfortunately, others utilize electronic messaging to send unsolicited bulk electronic messages, better known as "spam." Unsolicited electronic messages may include commercial advertisements, political messaging, as well as pornographic solicitations. Due to the influx of unsolicited electronic messages, people have become wary of giving out their electronic addresses for fear that their address will be sold to would-be solicitors. Further, a person is not always assured that a request to stop unsolicited electronic messages will be taken seriously. Moreover, it is difficult to ascertain who has sent unsolicited electronic messages, since solicitors often use fabricated addresses or refrain from including one altogether.

Some attempts have been made to allow recipients to filter out unwanted electronic messages. One method includes allowing recipients to "block" a sender's address by adding the sender's address to a list of unauthorized senders. However, this method falls short because such senders simply have to create different sender's addresses to circumvent the block. In addition, a sender's address can be blocked according to conventional techniques only after the recipient has viewed an electronic message from the sender, determined that it is unsolicited, and manually added the sender's address to the block list.

Other techniques for filtering unwanted electronic messages involve adding certain words or phrases to filtering systems that are integrated into popular electronic messaging software. For instance, a recipient who finds that unsolicited offers for mortgage loans are frequently received can insert the words "mortgage rate" into a filtering component of his electronic messaging program. Subsequent electronic messages that contain the words "mortgage rate" are filtered and placed in a delete or trash folder automatically. However, one problem with this approach is that filtering according to commonly-used words can be underinclusive, meaning that many unsolicited electronic messages do not contain the words placed by the recipient in the filter, and overinclusive, meaning that some electronic messages that the recipient expects or wants to receive may be filtered out. The result of this is that the recipient is required to review the electronic messages placed in the delete or trash folder to determine whether any desired electronic messages have been filtered out. In addition, setting up the filters and maintaining the filters over time requires a significant amount of user time and effort, and many e-mail recipients are not technically sophisticated to the point that they would be capable or comfortable managing this type of filtering system.

Thus, conventional techniques for avoiding unwanted electronic messages have been generally unsuccessful, and computer users are subjected to increasing numbers of such electronic messages. Accordingly, it would be an advancement in the art to provide systems and methods for more effectively managing electronic messages and reducing the number of unwanted messages.

BRIEF SUMMARY OF THE INVENTION

In general, the present invention relates to systems and methods for managing data associated with incoming electronic messages, including filtering incoming electronic messages according to the sender's address, which is an address that actually identifies or purports to identify the sender of the electronic message. The present invention also relates to a request/response technique for categorizing a sender's address as authorized, unauthorized, or unconfirmed, which categorizations are stored in an associated data structure. In addition, the present invention provides a number of complementary techniques for facilitating the process of populating the data structures that identify sender's addresses associated with authorized and unauthorized senders.

The present generally includes the following modules, which can be used separately or together to reduce the volume of unwanted electronic messages: Filter module, Categorization module, Data structure hierarchy module, Manual categorization module, Periodic recategorization module, Unconfirmed category management module, Outgoing mail categorization module, Network exchange module, Server exchange module, and Contact management module.

The filter module filters out unsolicited electronic messages according to various protocol set forth herein. The categorization module categorizes sender's addresses associated with electronic messages according to a request/response protocol set forth herein, which enables incoming electronic messages to be filtered and unwanted electronic messages discarded or rejected. The data structure hierarchy module provides various protocols for handling the situation where a sender's address may be found in more than one category. The manual categorization module allows a recipient to manually categorize sender's addresses or entire domain names, mailing lists, or other groupings of addresses. The periodic recategorization module reevaluates the category of sender's addresses that have been previously categorized. The unconfirmed category management module recategorizes sender's addresses that have been categorized as unconfirmed for a predetermined period of time. The outgoing mail categorization module allows a user to cause recipient's addresses in outgoing electronic messages to be automatically categorized as authorized. The network exchange module allows groups of users to share categorizations of sender's addresses, thereby increasing the efficiency of the electronic message filtering operations of the invention. The server exchange module allows servers in a network, such as the Internet, to exchange data structures that specify the categorization of sender's addresses, thereby making the identify of e-mail solicitors widely known. Finally, the contact management module allows the recipient to gather additional information about the sender when issuing the request/response protocol.

In general, the various electronic message management and filtering operations of the invention substantially increase the reliability and the ease by which unwanted electronic messages can be filtered out or avoided. Many of the techniques for identifying authorized and unauthorized senders can be implemented without requiring recipients to view unwanted electronic messages and manually categorize the sender's addresses. In general, the overhead associated with identifying authorized and unauthorized senders and maintaining the associated filtering system is placed on senders rather than recipients. While many of the methods described herein can be used in combination to reduce unwanted electronic messages, many can also be used individually to achieve desired results.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3B is a block diagram illustrating functional components of a recipient's computer that filter incoming electronic messages according to another embodiment of the invention.

DETAILED DESCRIPTION OF THE PREFERRED EMBODIMENTS

The present invention extends to both methods and systems for management of electronic messages so as to reduce the number of unsolicited or unwanted electronic messages received by recipients. The term "electronic messaging" includes any form of sending a message electronically including, but not limited to, via electronic mail ("e-mail"), instant messaging, and other forms of electronic communication that involve the use of a sender's address and a recipient's address. For sake of simplicity, the following overview of electronic messaging is described in the context of e-mail sent over the Internet. The term "unsolicited" in the context of the invention refers to any electronic message that is not desired by the user. The present invention provides various parameters which the system or a recipient can designate to indicate that an electronic message is undesired. Therefore, an unsolicited message is any unwanted message that is filtered out according to the parameters defined by the system or the recipient.

Figure 1:
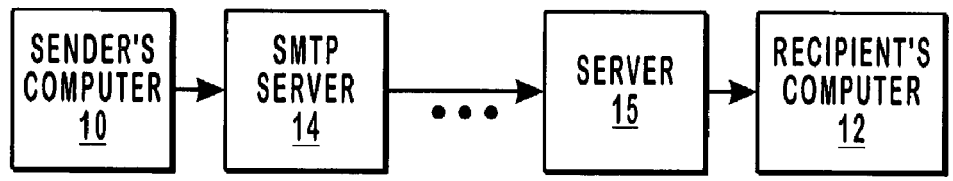
FIG. 1 is a block diagram illustrating a generalized network through which an electronic message is transmitted from a sender to a recipient.

A brief review of the operation of electronic mailing systems over the Internet is provided as follows. Generally, as shown in FIG. 1, a sender's computer 10 sends an electronic message to a recipient's or user's computer 12. The electronic message is routed through one or more simple mail transfer protocol (SMTP) servers 14 before arriving at the server 15 associated with computer 12. Server 15 may be a server residing on a local area network with computer 12, a server that computer 12 accesses via a modem pool or with another Internet connection, a web server that provides web-based electronic messaging services to computer 12, or a server that operates with computer 12 in any of a variety of other network configurations. In order to initiate transmission of the electronic message to the recipient, the sender addresses the electronic message using the recipient's address, which is input either manually or automatically. Such recipients can be direct recipients (often designated in a "to:" field) or indirect recipients (often designated in "cc:", or carbon copy fields or "bcc:", or blind carbon copy fields). Recipient's addresses are obtained by the sender in any of a variety of manners. Senders of unwanted electronic messages often obtain the recipient's address from mass mailing lists.

Figure 2:
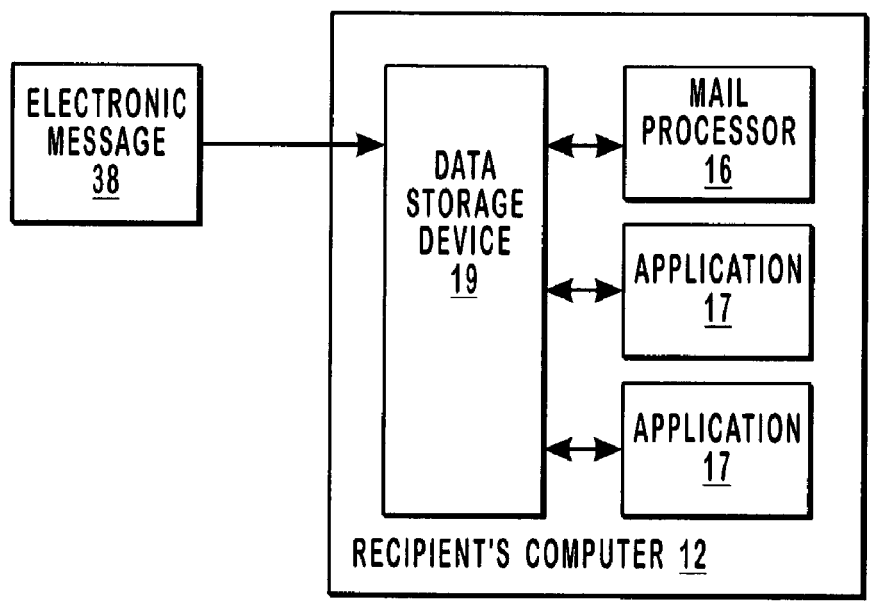
FIG. 2 is a block diagram depicting a generalized recipient's computer having a mail processor as one of various applications associated with a data storage device.

As shown in FIG. 2, once the electronic message arrives at computer 12, a mail processor 16, which is an application that processes the electronic message. Computer 12 can also include other applications 17, such as a calendaring program, a contacts program, and the like. Data storage device 19 may store data used by mail processor 16 and applications 17. There are several well-known software packages that combine a mail processor 16 with applications 17 to perform mail processing and other data management functions.

As described in further detail hereinafter, the process of filtering incoming electronic messages according to the invention can take place at server 15 or the user's computer 12. Moreover, the present invention also relates to a request/response technique for identifying authorized or unauthorized sender's addresses as well as any of a number of complementary techniques for facilitating the process of populating the data structures that identify sender's addresses associated with authorized and unauthorized senders.

These complementary techniques in general enhance the practicability of the basic request/response protocol. Moreover, using any or all of the other methods for categorizing sender's addresses in combination with the request/response protocol described herein can enable the request/response technique to be used as a last resort or, in any event, used less frequently than if the request/response protocol were the only available method for identifying whether a sender is authorized to send electronic messages to the user. While implementing only the basic request/response protocol can provide useful results in many instances, the use of the other complementary techniques as the initial way of identifying whether senders are authorized is often preferred, since these complementary techniques are generally not as intrusive and require less effort on the part of the sender than the request/response protocol.

Figure 3A:
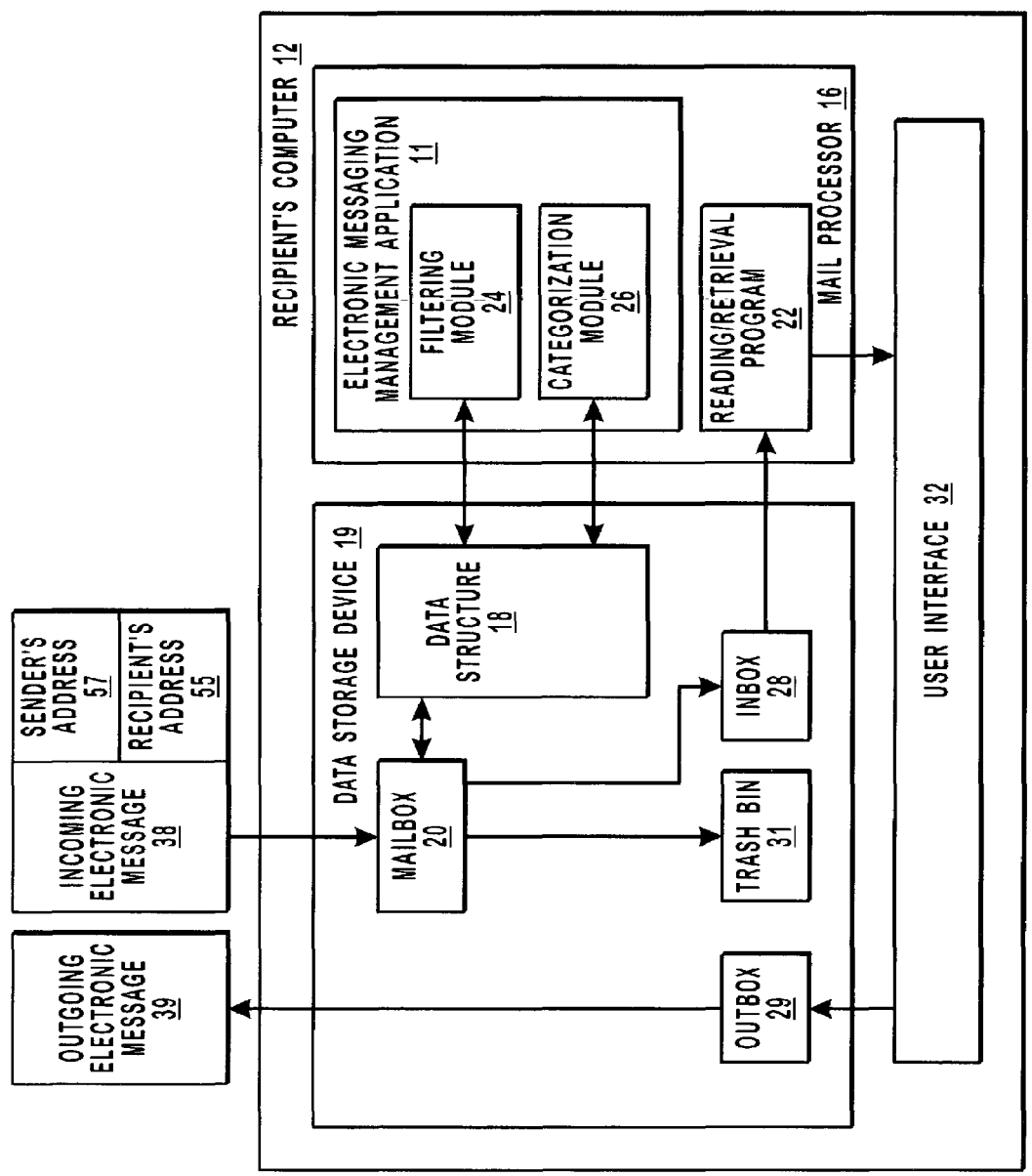
FIG. 3A is a block diagram illustrating functional components of a recipient's computer that filter incoming electronic messages according to an embodiment of the invention.
Figures 3C, 4:
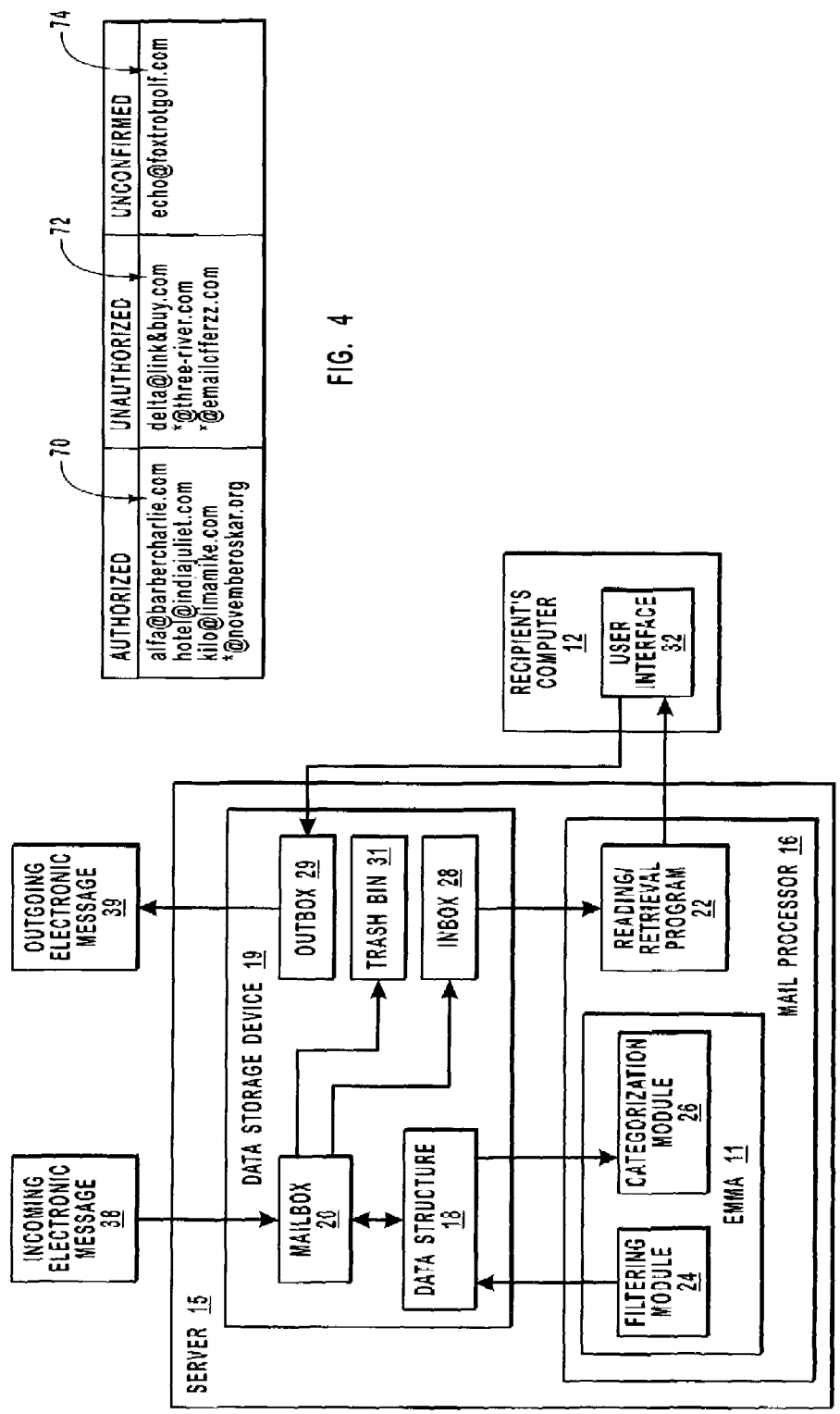
FIG. 3C is a block diagram illustrating functional components of a server and an associated recipient's computer that filter incoming electronic messages according to an embodiment of the invention.
FIG. 4 illustrates a data structure that includes fields for authorized, unauthorized, and unconfirmed sender's addresses.

FIGS. 3A and 3B illustrate examples of functional components of a user's computer 12 for processing electronic messages at the user's computer 12, whereas FIG. 3C illustrates an example of functional components of a server 15 that processes incoming electronic messages on behalf of the user's computer 12.

As shown in FIGS. 3A and 3B, a mail processor 16 examines and processes each incoming electronic message 38. Generally, mail processor 16 operates in conjunction with data storage device 19. When an incoming electronic message 38 is received at the user's computer 12, the incoming electronic message is stored at a mailbox 20 of the data storage device 19. In general, incoming electronic message 38 includes a recipient's address 55 and may or may not include a sender's address 57. Mailbox 20 holds incoming electronic messages 38 until they are filtered according to data structure 18 by electronic messaging management application 11.

As shown in FIG. 3A, the inventive electronic messaging management application 11 of the present invention interfaces with mail processor 16 and data storage device 19. Electronic messaging management application 11 provides a filter module 24, as will be described in more detail below, to effectively filter out unsolicited electronic messages by referencing sender's addresses that have been categorized into "authorized" addresses, "unconfirmed" addresses, and "unauthorized" addresses, which categorizations have been previously stored in data structure 18. The significance of these categories will be described in more detail below.

The electronic messaging management application 11 also provides various features that allow the recipient increased ability to manage data structure 18 in the context of electronic messaging. For example, the electronic messaging management application 11 provides a categorization module 26 that categorizes sender's addresses as "authorized," "unauthorized," or "unconfirmed" and modifies data structure 18 accordingly. In addition, through electronic messaging management application 11, many functions are available to make maintaining information in data structure 18 easier for the recipient.

Electronic messages that have been filtered are sent to either an inbox 28 or a trash bin 31. A reading/retrieval program 22 accesses electronic messages from inbox 28 or from other folders or boxes and enables them to be viewed on the user interface 32. Outgoing messages processed by mail processor 16 are transmitted from an outbox. The user interface 32 also allows the recipient user to otherwise interact with aspects of mail processor 16, electronic messaging management application 11, and data structure 18. For example, through user interface 32, the recipient can access and manipulate electronic messages as well as information that is used to filter incoming electronic messages.

The electronic messaging management application 11 can be implemented in any of a variety of ways that will be understood by those of skill in the art upon learning of the invention disclosed herein. For example, much of the electronic messaging management application 11 can be implemented and caused to perform methods of the invention using commands and functionality that are natively supported by some existing mail processors. Alternatively, electronic messaging management application 11 can be a functional component written in computer-executable code that is separate from the mail processor 16 and that interfaces with the mail processor. FIGS. 3A and 3B show two different embodiments in which electronic messaging management application 11 can be integrated into an operating system located on a user's computer 12. In FIG. 3A, electronic messaging management application 11 is integrated into mail processor 16. In FIG. 3B, electronic messaging management application 11 is separate from, but still interacts with, mail processor 16.

FIG. 3C represents an embodiment where a mail processor 16 is operated on server 15. A user's computer 12 serves as an interface between the recipient and server 15. Electronic messaging management application 11 may be integrated with mail processor 16 in a manner similar to that described in reference to FIGS. 3A and 3B. That is, electronic messaging management application 11 can be implemented and caused to perform the methods of the invention using commands and functionality that are natively supported by mail processor 16. Alternatively, electronic messaging management application 11 can be a functional component written in computer-executable code that is separate from mail processor 16 and that interfaces with mail processor 16. The embodiment shown in FIG. 3C is representative of the latter situation. The filtering methods performed by server 15 according to FIG. 3C can be operated according to an application service provider (ASP) model by which the filtering functionality is hosted by an Internet server and accessed by recipient computer 12 over the Internet.

As many aspects of the electronic messaging management application 11 interact with data structure 18, a more detailed discussion of data structure 18 follows. FIG. 4 illustrates a data structure 18 that has fields in which sender's addresses are categorized. Each sender's address is generally separated into one of three categories. The "authorized" category 70 includes any sender's address that represents a sender who has been affirmatively authorized to send electronic messages to the recipient. The "unauthorized" category 72 includes any sender's address that represents a sender who has been prohibited from sending electronic messages, and whose electronic messages are to be filtered out by the filter module 24. An unauthorized sender's address can include those that have been specifically identified with those who send unsolicited mail and can include those that are presumed to be false addresses or who incorrectly address electronic messages to the recipient. An unauthorized electronic message is generally one considered to be unsolicited. The "unconfirmed" category 74 includes any sender's address that has not yet been categorized as authorized or unauthorized. An "unconfirmed" electronic message may or may not be unsolicited.

As shown in FIG. 4, each category may have any number of sender's addresses. For example, FIG. 4 shows that various sender's addresses have been authorized and are thus stored in the authorized category 70 of data structure 18. A variety of formats for sender's addresses are possible, and data structure 18 is configured to hold any variation of sender's address. Furthermore, data structure 18 may contain symbolic sender's addresses that do not necessarily refer to a single sender's address. For example, the sender's address *@novemberoscar.org shown in the authorized category 70 includes a wildcard character, indicating that any address having the domain name "novemberoscar.org" is authorized to send electronic messages to the recipient computer 12. Similarly, an entire domain name may be unauthorized. The sender's address *@three-river.com in the unauthorized category 72 shows that any sender's address having the domain name "three-river.com" is unauthorized and will be filtered appropriately. It will be appreciated that sender's addresses located in data structure 18 may be added, deleted, modified, or transferred from one category to another. Changes to data structure 18 can be done through a number of different modules in electronic messaging management application 11.

As used herein, the term "sender's address" refers to an address that accompanies an incoming electronic message and either actually identifies or purports to identify the sender. Many senders of unsolicited electronic messages send false addresses that do not correctly identify the sender. As used herein, addresses that accompany unsolicited electronic messages represent examples of "sender's addresses" regardless of whether the addresses actually identify the sender or are false addresses.

As discussed above, electronic messaging management application 11 provides various modules that may function together or alone to filter incoming electronic messages or manage the data structure that is used in the filtering process. In doing so, the recipient is provided with ways to make management of unsolicited electronic messages more efficient. Various functional modules associated with the electronic messaging management application 11 are described below. While the filtering module can be used with two or more of the other functional modules described below to provide enhanced messaging filtering, any single module can be used together with the filtering module to reduce the number of unsolicited electronic messages received by recipients.

I. Filter Module

As discussed above, electronic messaging management application 11 provides a filter module 24 to filter out unsolicited electronic messages. Filter module 24 compares a sender's address associated with an incoming electronic message to the categorizations provided or stored in data structure 18. If the sender's address is located in the authorized category, the filter module 24 routes the incoming message to the user's inbox 28. If the sender's address is located in the unauthorized category, the filter module 24 routes the incoming message to the trash box 31. If the sender's address is located in the unconfirmed category, the filter module 24 routes the incoming message to an unconfirmed folder 69.

Figure 5:
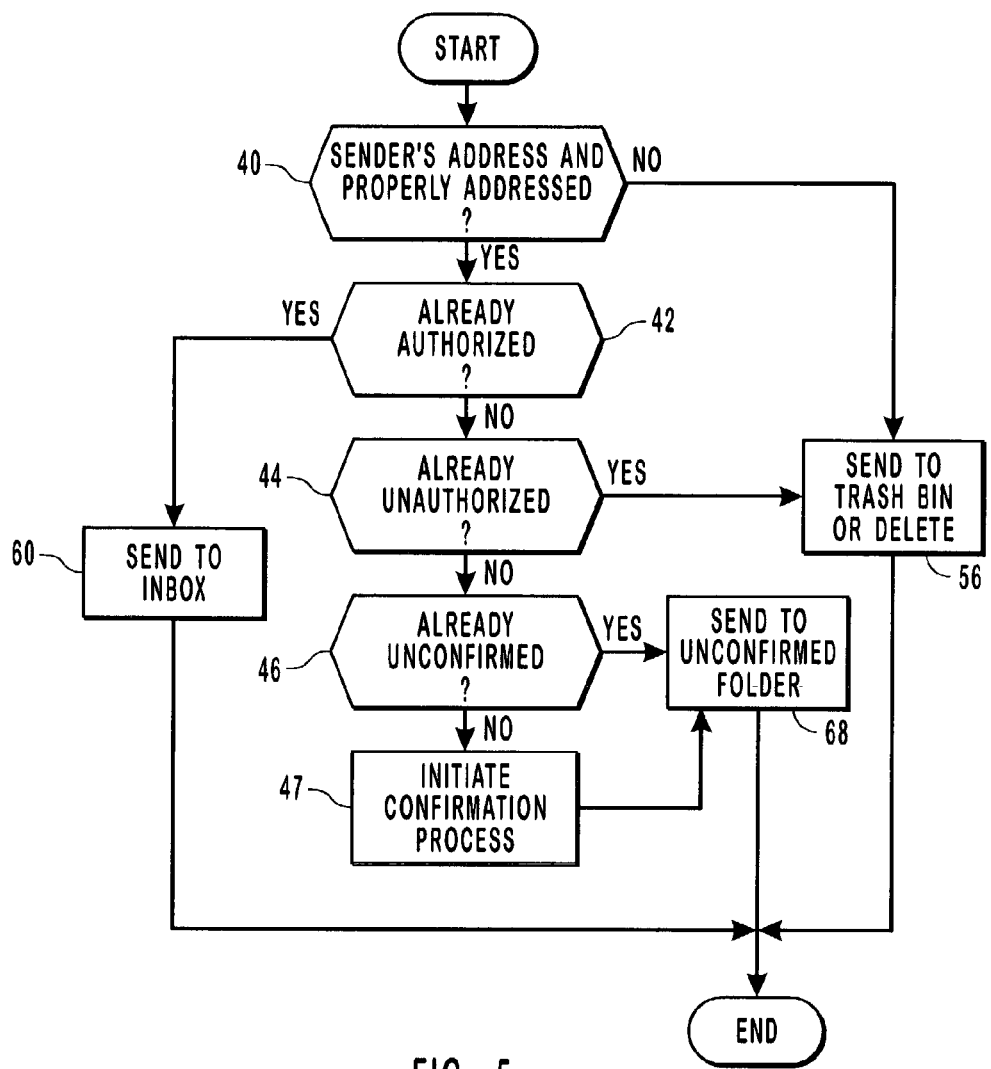
FIG. 5 is a block diagram illustrating functional components of the categorization modules according to one embodiment of the invention.

FIG. 5 shows a flow chart that illustrates a method for filtering incoming electronic messages using filter module 24. Filter module 24 may be initiated by the presence of an incoming message 38 in mailbox 20. In another embodiment, filter module 24 may be activated periodically to detect whether an incoming message 38 is present in mailbox 20. At step 40, filter module 24 detects whether a sender's address accompanies the incoming message 38 and whether the incoming message 38 is properly addressed to the recipient (i.e., whether the recipient's address appears in the "to:", "cc:", or "bcc:" fields). At step 56, if a sender's address is not associated with incoming message 38 or if the message is not properly addressed to the recipient, the incoming message 38 is assumed to be unsolicited and sent to a trash bin 31 or automatically deleted. The techniques for filtering electronic messages are described herein primarily in combination with deleting electronic messages of unauthorized senders or placing them in a trash bin. However, the use of any other mechanism to segregate or differentiate electronic messages of authorized, unauthorized, and unconfirmed senders can be used. For instance, any desired set of folders or message boxes can be used, as well as sorting electronic messages based on the categorization of the sender, or the use of various colors, fonts, icons, or other visual mechanism to represent the categorization of the sender.

If the electronic message includes a sender's address and is properly addressed to the recipient, the sender's address that accompanies the electronic message 38 is compared to data structure 18 in step 42 to determine whether data structure 18 already has the sender's address categorized as authorized. At step 60, if the sender's address is already authorized, filter module 24 allows electronic message 38 to be sent directly to the user's inbox 28.

At step 44, if the sender's address is not already categorized as authorized, the senders' address is compared with data structure 18 to determine whether the sender's address is already categorized as unauthorized. At step 56, if the sender's address is already categorized as unauthorized, the electronic message 38 associated with the sender's address is sent directly to a trash bin 31 or automatically deleted. In the event of sending the electronic message 38 to the trash bin or deleting it, a reply electronic message can optionally be sent to the sender informing the sender of this action, which can encourage valid sender's to take steps that conform with the invention disclosed herein in order to become an authorized sender. Likewise, such reply electronic messages can be sent to senders, to the extent that a purported sender can be identified, whenever an incoming message is filtered and subsequently deleted or sent to the trash bin.

At step 46, if the sender's address is neither authorized nor unauthorized, the sender's address is compared to data structure 18 to determine whether the sender's address is already categorized as unconfirmed. At step 68, if the sender's address is already categorized as unconfirmed, the electronic message is sent to a folder associated with the mail processor, such as an unconfirmed folder, to await confirmation that the sender's address is either authorized or unauthorized. If, however, the sender's address is also not yet unconfirmed, the electronic message is also sent to the unconfirmed folder and the process of confirming whether the sender's address is either authorized or unauthorized is initiated in step 47, examples of which are described in greater detail below. Optionally, step 68 can additionally include the same process of confirming whether the sender's address is authorized or unauthorized in response to determining, in step 46, that the sender's address is already categorized as being unconfirmed.

Thus, steps 42, 44, and 46 are performed in order to determine whether a previous categorization of the sender's address has already occurred and the electronic message filtered accordingly. It will be appreciated that steps 42, 44, and 46 do not have to occur in the particular order described above.

II. Categorization Module

Figure 6:
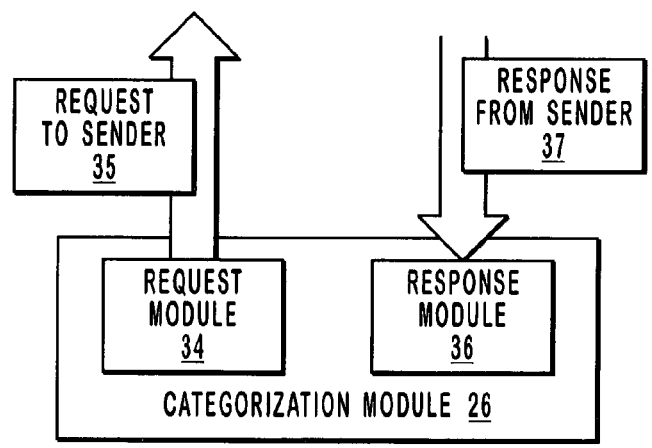
FIG. 6 is a flow diagram illustrating a method for filtering incoming electronic messages.

In general, when an incoming electronic message is received and the message has a sender whose address is being processed for the first time or, optionally, is already categorized as being unconfirmed, the categorization module 26 determines the category in which the particular sender's address will be located in data structure 18. As shown in FIG. 6, categorization module 26 comprises a request module 34, and a response module 36. When an incoming message is received, the request module 34 sends a request 35 in the form of an electronic message to the sender's address requesting a response to one or more predetermined questions prepared by the recipient. The request 35 is configured to be answered by a person. As such, the request 35 contains a response field which allows a person to manually respond to the request.

The request 35 sent by request module 34 may be in the form of an electronic message in which the sender enters a response in the subject field. In another embodiment, the request 35 may be in the form of a web-based electronic transmission which is sent outside the sender's electronic messaging processor. In this case, the request 35 still contains a field for the sender to input a reply. In one embodiment, the recipient prepares various questions that a person can easily answer, and the request module 34 randomly selects a predetermined question to use. In another embodiment, request module 34 selects from a number of predetermined questions. In yet another embodiment, the request 35 contains an explanation of the reasons for the request and/or a legal contract binding the sender to use the recipient's address only for solicited purposes. The request 35 also includes a time marker which is subsequently used to determine the timeliness of the response.

Response module 36 provides a protocol for determining how to categorize the sender's address based on the content and timeliness of the response 37 or lack thereof. In order to be authorized, not only does a person have to manually respond to the request, but the person must also provide an accurate response 37. Optionally, the response 37, in order to be accurate, must also include a legally binding agreement executed by the sender. The system may set a predetermined length of time. Alternatively, the recipient may select the amount of time which the recipient considers to be timely. If the response 37 is timely and substantially accurate, the sender's address is categorized as "authorized." This categorization is transmitted to data structure 18 which is modified accordingly. If the response is timely but inaccurate, the sender's address is categorized as "unauthorized" and such information is transmitted to data structure 18 which is modified accordingly. Optionally, the sender may be given multiple opportunities to provide an accurate, timely response, thereby reducing the likelihood that an inadvertent, incorrect response from a sender who would otherwise be authorized would result in placing the sender's address in the unauthorized category. If there is no response to the request 35, after a predetermined period of time, the sender's address is categorized as "unconfirmed". This information is transmitted to data structure 18 which is modified accordingly. In one embodiment, all categorization of sender's addresses is recorded in a log file so that the recipient may view this information.

In order to prevent senders of unwanted electronic messages from responding automatically to request 35 and circumventing the categorization processes described herein, various techniques can be used to verify whether a response 37 to request 35 has been made by a person or by an automated system. In general, senders of unwanted electronic messages could attempt to establish an automated system for automatically generating responses 37 that appear to have been made by a person. Accordingly, the invention extends to increasingly rigorous requests 35 that are increasingly difficult to respond to in an automated manner. Moreover, in order to adapt the request module 34 to the different types of requests, the requests can be modular in the sense that one type of request can be substituted for another or layered one upon another to prevent circumvention by senders of unwanted electronic messages.

The invention extends to substantially any type of request that is selected to be responded to only by persons. Examples of such requests include those that require a response using a certified electronic mail having a digital certificate or a response made using Secure Sockets Layer (SSL) with a client certificate. Other examples includes requiring are response that is sent through the mail system (e.g., U.S. mail) or by telephone. Alternatively, the request can require a response that is made at a web site having questions that are likely to be answerable only by a person.

Another approach involves requiring the response to include a token payment using, for example, an electronic payment system, which may be any of a number of existing payment systems that have been used in the past for other electronic transactions. The payment can be large enough to discourage senders of mass electronic mailing from making the payment for each of its numerous recipients. At the same time, the payment can be small enough that it is negligible for those who are sending electronic messages only to one or a small number of recipients. Requesting payment authenticates the sender, verifies that a person responds to the request rather than an automated system, and serves as a barrier to mass electronic mailings.

A similar payment system can be employed to authorize those who would otherwise be unauthorized. In particular, a sender who would otherwise be categorized as unauthorized can be permitted to send an electronic message upon payment of a small fee. At least part of the proceeds can be payable to the recipient, with part of the proceeds being paid to the entity that provides the electronic message filtering services described herein. The amount of the fee can vary, and is typically small enough to permit such senders of otherwise unwanted electronic messages. Variations of this method are possible, such as reducing the amount that is to be paid per message for senders sending multiple electronic messages to a particular recipient or selecting the amount based on the frequency by which the sender transmits electronic messages.

Another option for verifying whether a sender exists as part of the process of determining whether to authorize the sender involves sending a request electronic message to a manager of the domain of the sender's address instead of, or in addition to, sending the request to the purported sender. For instance, if an incoming electronic message has a sender's address of "sender@alfabaker.com", the request that is used to verify whether the sender is to be authorized can be sent to "sender@alfabaker.com", a manager of the domain "alfabaker.com" (e.g., postmaster@alfabaker.com), or both. The manager can verify whether the purported sender's address is in fact a valid address, which would generally not be the case when a spammer spoofs a sender's address.

Figure 7:
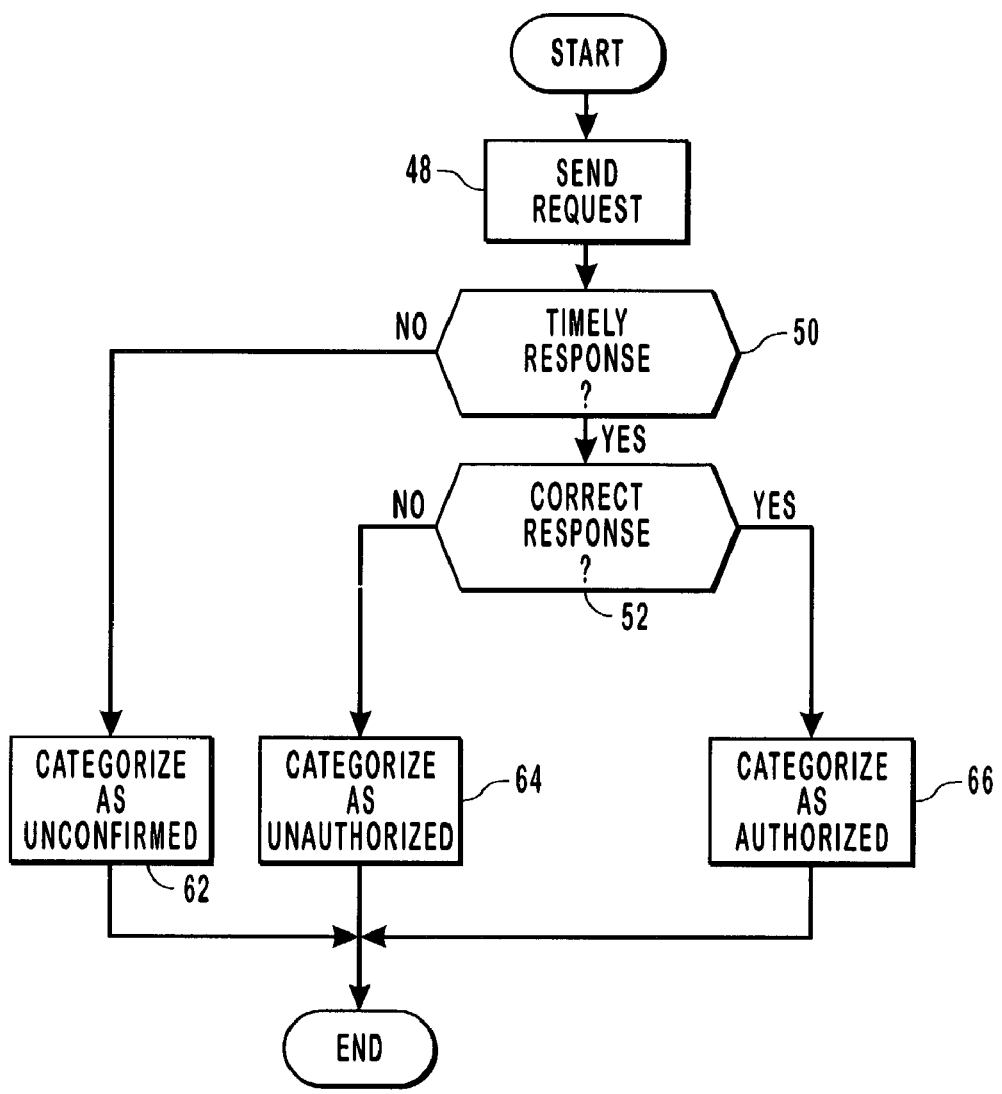
FIG. 7 is a flow diagram illustrating method for categorizing sender's addresses into authorized, unauthorized, and unconfirmed categories in the data structure.

The flow chart of FIG. 7 shows the steps performed by categorization module 26 in further detail. Categorization module 26 may be initiated by the presence of an incoming electronic message 38. At step 48, request module 34 sends a request 35 to the sender's address requesting a response. At steps 50 and 52 response module 36 evaluates the response 37 or lack thereof to determine whether the sender's address is authorized. At step 50, the response 37 is evaluated to determine whether it was received within a predetermined period of time (or if a response is received at all). At step 62, if no timely response is received, the sender's address is categorized as unconfirmed. At step 52, the timely response is evaluated to determine whether it is correct. At step 64, if the response is timely and incorrect, the sender's address is categorized as unauthorized and data structure 18 modified accordingly. At step 66, if the response 37 is timely and correct, the sender's address is categorized as authorized and data structure 18 modified accordingly. It will be appreciated that steps 50 and 52 may be interchangeable. For example, the system could first determine whether a response is in fact received after a predetermined period of time.

Figure 8:
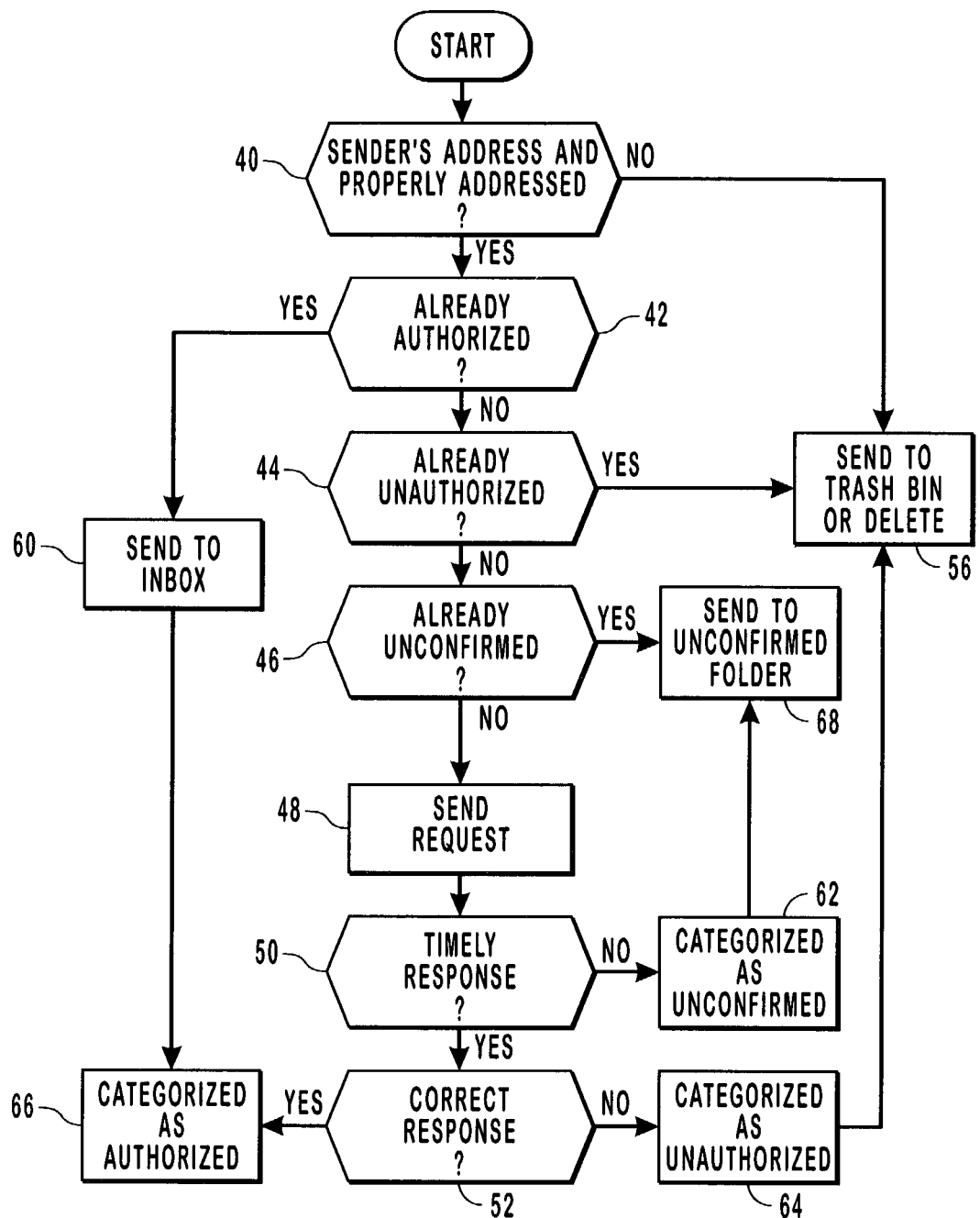
FIG. 8 is a flow diagram illustrating the integration of the methods of FIGS. 6 and 7.

The flow chart shown in FIG. 8 shows how filter module 24 can be integrated with categorization module 26. Generally, the process of the filter module 24 is performed first, followed by the process performed by categorization module 26, although they are not limited to this particular order.

The module shown in FIG. 8 may be initiated by the presence of an incoming message 38 in mailbox 20. In another embodiment, the module may be activated periodically to detect whether an incoming message 38 is present in mailbox 20. At step 40, filter module 24 detects whether a sender's address accompanies the incoming message 38 and whether the incoming message 38 is properly addressed to the recipient (i.e., whether the recipient's address appears in the "to:", "cc:", or "bcc:" fields). At step 56, if a sender's address is not associated with incoming message 38 or if the message is not properly addressed to the recipient, the incoming message 38 is assumed to be unsolicited and sent to a trash bin 31 or automatically deleted. Similarly, at step 40, At step 42, the sender's address that accompanies the electronic message 38 is compared to data structure 18 to determine whether data structure 18 already has the sender's address categorized as authorized. At step 60, if the sender's address is already authorized, filter module 24 allows electronic message 38 to be sent directly to the user's inbox 28.

At step 44, if the sender's address is not already categorized as authorized, the sender's address is compared with data structure 18 to determine whether the sender's address is already categorized as unauthorized. At step 56, if the sender's address is already categorized as unauthorized, the electronic message 38 associated with the sender's address is sent directly to a trash bin 31 or automatically deleted.

At step 46, if the sender's address is neither authorized nor unauthorized, the sender's address is compared to data structure 18 to determine whether the sender's address is already categorized as unconfirmed. At step 68, if the sender's address is already categorized as unconfirmed, the electronic message is sent to an unconfirmed folder 69 to await further action.

At step 48, if the sender's address is neither authorized, unauthorized, or unconfirmed, request module 34 sends a request 35 to the sender's address requesting a response. At steps 50 and 52 response module 36 evaluates the response 37 or lack thereof to determine whether the sender's address is authorized. At step 50, the response 37 is evaluated to determine whether it was received within a predetermined period of time (or if a response is received at all). At step 62, if no timely response is received, the sender's address is categorized as unconfirmed. At step 52, the timely response is evaluated to determine whether it is correct. At step 64, if the response is timely and incorrect, the sender's address is categorized as unauthorized and data structure 18 modified accordingly. At step 66, if the response 37 is timely and correct, the sender's address is categorized as authorized and data structure 18 modified accordingly. It will be appreciated that steps 50 and 52 may be interchangeable. For example, the system could first determine whether a response is in fact received after a predetermined period of time.

The system or the recipient may decide how much time lapses between when an electronic message 38 is sent from the unconfirmed folder to the trash bin. Furthermore, the system or the recipient may determine how much time lapses between when an electronic message 38 in the trash bin is to be automatically deleted. Furthermore, it will be appreciated, as will be discussed below, that the recipient can manually transfer electronic messages between the unconfirmed folder and the trash bin and can delete such messages. This process can be used to further determine whether the user considers the electronic messages to be unwanted and, accordingly, to automatically or semi-automatically categorize the sender's address in one of the categories. An example of a semi-automated process would be to ask the user's permission before moving or deleting messages.

While filter module 24 and categorization module 26 may be integrated, they may also function separately and distinctly. Similarly, many features of the electronic messaging management application 11 may be integrated or, alternatively, function separately.

III. Data Structure Hierarchy Protocol Module

In general, it is possible for a sender's address to be in more than one category at the same time. For example, if the recipient has designated the entire domain name *@alfabaker.com as unauthorized but one acquaintance having the address acquaintance@alfabaker.com is authorized (i.e., successfully responds to the request/response protocol in categorization module 26 or is manually authorized by recipient), a potential conflict exists.

A data structure hierarchy module associated with the electronic messaging management application 11 provides multiple ways to handle this conflict. In one embodiment, data structure categories are prioritized based on the order of steps 42, 44 and 46 of filter module 24. If unauthorized addresses should always be filtered, then step 44 should precede steps 42 and 46 to provide a more stringent filter to catch any electronic messages that for some reason are in both the authorized and unauthorized categories. In another embodiment, the system or recipient designates a category to take priority when a sender's address is presented for entry in two or more categories and deletes any other reference to that address in data structure 18. For example, if authorized designations take priority, when a sender's address that already exists in the unconfirmed category is also presented in the authorized category, the sender's address becomes part of the authorized category and the reference to the sender's address in the unconfirmed category is deleted. In yet another embodiment, the system or recipient could set a protocol which adopts the most recent categorization and deletes all older categorizations. Any combination of these embodiments may be provided or selected by the recipient depending on how stringent or relaxed the system or recipient desires the filtering of electronic messages to be.

IV. Manual Categorization Module

A manual categorization module associated with the electronic messaging management application 11 allows the recipient to manually authorize sender's addresses through interface 32. Referring back to FIG. 4, data structure 18 is divided into three categories. Recipient may enter any category 70, 72, 74 in data structure 18 and select a different category for a particular sender's address. For example, the recipient may go into the unconfirmed category 74 and modify a sender's address to be authorized 70 or unauthorized 72.

The recipient may also categorize entire domain names. For example, the recipient may indicate *@alfabaker.com to be authorized senders. This indicates that all electronic messages associated with senders having in their address "alfabaker.com" should be allowed to pass through to the user's inbox 28 unimpeded. Similarly, the recipient may indicate entire domain names to be unauthorized.

As indicated above with reference to data structure hierarchy module 27, it is possible to have the recipient affirmatively choose to have an electronic message which is sent to numerous recipient's (i.e., a bulk electronic message). However, if a recipient does select a sender's address who sends bulk electronic messages, then the electronic message does not fit the definition of "unsolicited" electronic message. As indicated above, an "unsolicited" electronic message is one undesired by the recipient.

V. Periodic Recategorization Module

After a period of time, the categorization of a sender's address may no longer be accurate. However, for the recipient to reconfirm each sender's address would be extremely time consuming. Thus, a periodic recategorization module associated with the electronic messaging management application 11, at predetermined intervals (or at times requested by the recipient), reevaluates the category in which the sender's address should be identified. It will be appreciated that many of the steps may be similar to the steps described for categorization module 26. That is, the periodic recategorization module utilizes the same response/request protocol for new incoming messages.

Figure 9A:
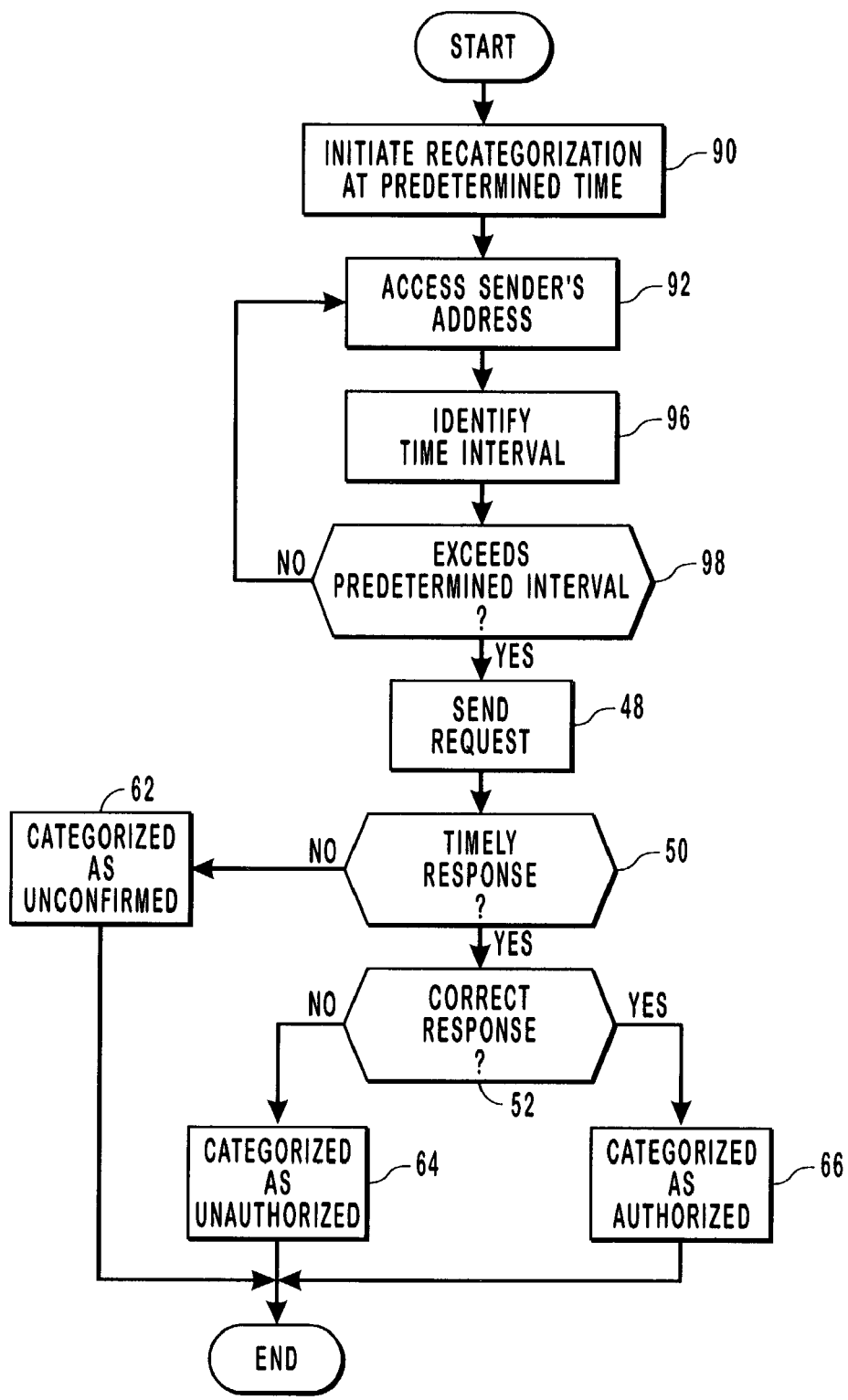
FIG. 9A is a flow diagram illustrating periodic updating of the data structure according to one embodiment of the invention.

In one embodiment, the data structure 18 is modified according to the steps shown in FIG. 9A. At step 90, the system is initiated at a predetermined time interval or by the recipient. At step 92, a periodic recategorization module associated with the electronic messaging management application accesses a sender's address in a particular category. No particular order is necessary. In one embodiment, the system begins at the first sender's address located in authorized category 70 and works its way toward the end of the list. Then the system proceeds to the first sender's address in the unauthorized category 72 and proceeds through the list. The order in which the system accesses sender's address will depend largely on how data structure 18 is configured. At step 96, each sender's address is evaluated to determine the time interval since the last categorization for that particular sender's address. At step 98, the time interval is evaluated to determine whether it exceeds a predetermined time interval. If the time interval does not exceed a certain predetermined time interval, the system returns to step 92 to access the next sender's address. The system assumes that recategorization of that particular sender's address may not be necessary since it may be assumed to be current. If the time interval does exceed a predetermined time interval, the system advances to step 48.

At step 48, a request 35 is sent to each senders' address as described above with reference to FIG. 7 and the categorization module 26. The sender's address is then recategorized based on the criteria set forth previously for categorization module 26. That is, at steps 50 and 62, if no timely response is received, the sender's address is categorized as unconfirmed and the data structure 18 modified accordingly. At steps 52 and 64, for a timely but invalid response, the sender's address is categorized as unauthorized. And, at steps 54 and 66, for a timely and correct response, the sender's address is categorized as authorized. If an unconfirmed sender's address is now determined to be authorized, the sender's address is added to the authorized category and deleted from the unconfirmed category. Also, in response to the categorization of the sender's address as being authorized, any new electronic messages received from the sender or, optionally, any new or old electronic messages from the sender, can be automatically moved to the appropriate folder. These categorizations may or may not be the same as the previous categorization previous assigned to the sender's address. Accordingly, where a categorization has changed, data structure 18 is modified to reflect the updated categorization.

In this embodiment, the time for response may be increased because the periodic recategorization module was initiated without an incoming message. Thus, the sender may not have access to a computer in a relatively short time period to respond to the request, which, in the absence of increasing the time for response, would increase the likelihood of unconfirmed sender's addresses. The above steps are repeated until all sender's addresses are recategorized.

Figure 9B:
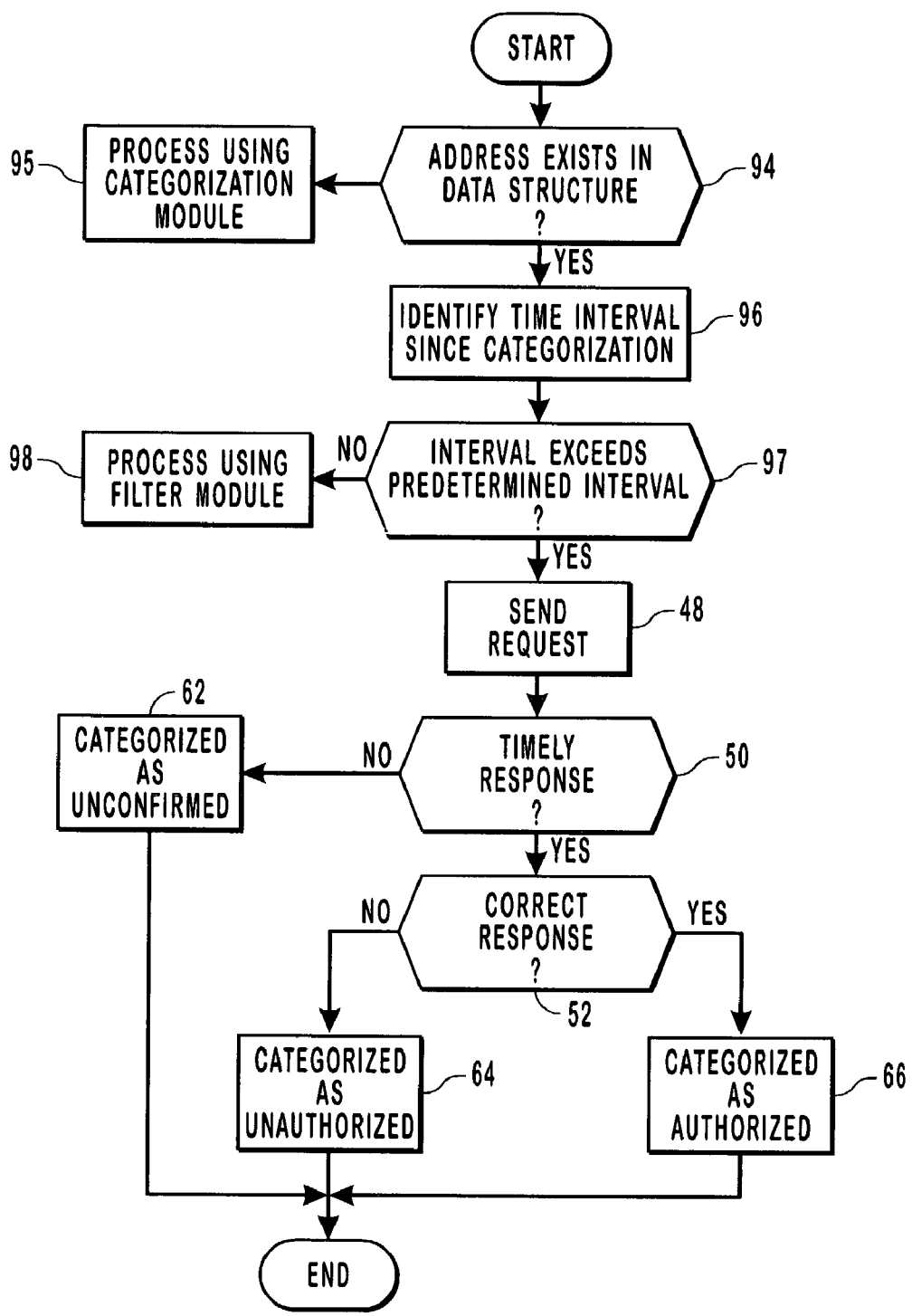
FIG. 9B is a flow diagram illustrating periodic updating of the data structure according to another embodiment of the invention.

In the embodiment shown in FIG. 9B, the periodic recategorization module is initiated by the presence of an incoming message 38. At step 94, incoming message 38 is evaluated to determine whether the sender's address already exists in data structure 18. At step 95, the process ends or it may initiate categorization module 26. At step 96, if the sender's address already exists in data structure 18, the sender's address is evaluated to determine the time interval since the last categorization for that particular sender's address. At step 97, the time interval is evaluated to determine whether the time interval exceeds a predetermined time interval. At step 98, if the time interval does not exceed a predetermined time interval, the process ends or the system may initiate filter module 24. If, however, the sender's address exceeds a predetermined time interval, request module 34 is initiated at step 48 to send a request 35 to that sender's address.

The sender's address is then recategorized based on the criteria set forth previously for categorization module 26. That is, at steps 50 and 62, if no timely response is received, the sender's address is categorized as unconfirmed and the data structure 18 modified accordingly. At steps 52 and 64, for a timely but invalid response, the sender's address is categorized as unauthorized. And, at steps 54 and 66, for a timely and correct response, the sender's address is categorized as authorized. If an unconfirmed sender's address is now determined to be authorized, the sender's address is inputted into the authorized category and deleted from the unconfirmed category. These categorizations may or may not be the same as the previous categorization previous assigned to the sender's address. Accordingly, where a categorization has changed, data structure 18 is modified to reflect the updated categorization. It will be appreciated that in either embodiment, the recipient may manually initiate recategorization of all sender's addresses in data structure 18.

VI. Unconfirmed Category Management Module

At some point, if a sender does not respond to the request initiated by categorization module 26, it is likely that the electronic message associated with the sender's address is unsolicited mail. Not only is it likely that an unconfirmed sender's address that remains too long in the system is unsolicited mail, but the electronic message attached to the unconfirmed address located in the unconfirmed folder takes up valuable storage space. Thus, an unconfirmed category management module associated with the electronic messaging management application 11 provides for handling of sender's address that have been unconfirmed past a predetermined time period.

Figure 10:
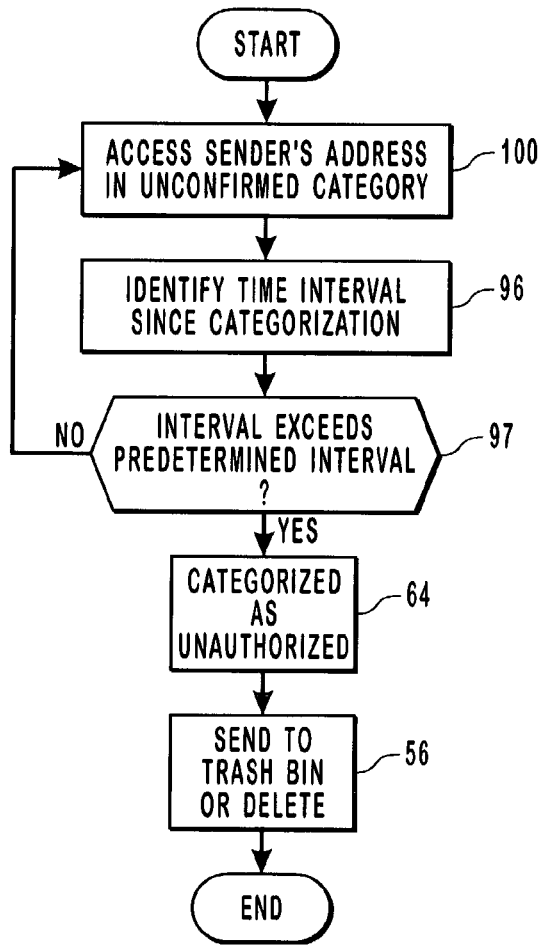
FIG. 10 is a flow diagram illustrating a method for managing electronic messages residing in an unconfirmed folder.

As shown in FIG. 10, the unconfirmed category management module periodically recategorizes sender's addresses in the unconfirmed 74 category as unauthorized 72. At step 100, the system accesses the sender's addresses located in unconfirmed category 74. At step 96, the sender's address is evaluated to determine the time interval since the last categorization for that particular sender's address. At step 97, the time interval is evaluated to determine whether the time interval exceeds a predetermined time interval. If the time interval does not meet a predetermined time interval, system returns to step 100 to access the next sender's address. At step 64, if the sender's address exceeds a predetermined time interval, the sender's address is categorized as unauthorized and data structure 18 modified accordingly. At step 56, the associated electronic message is sent to trash bin 31. As discussed above, the electronic messages may be automatically deleted from the trash bin after a predetermined period of time.

VII. Outgoing Message Categorization Module

An outgoing message categorization module associated with electronic messaging management application 11 provides for addresses included in outgoing messages to be categorized as authorized. In one embodiment, the recipient selects whether or not an address that identifies a recipient of an outgoing electronic message is to be categorized as authorized. In general, because recipients can be addressed in different ways by, for example, being designated in the "to:", "cc:" or "bcc:" fields, the rules for categorizing recipients of outgoing electronic messages can vary based on the way in which they are addressed. For instance, recipients addressed in the "to:" field may be assumed to be trusted and "bcc:" recipients highly trusted, which, in one embodiment, can result in these recipients being automatically categorized as being authorized, with "cc:" recipients being categorized as authorized only after prompting the user (i.e., the sender of the outgoing electronic message) to make an affirmative decision of the categorization. However, any set of rules are compatible with the invention disclosed herein.

This embodiment may be useful if the recipient does not want all outgoing mail sender's addresses to be authorized. In another embodiment, all sender's addresses included in outgoing electronic messages are categorized as authorized. It will be appreciated that outgoing electronic messages include those electronic messages that originate from the recipient or those that are forwarded by the recipient.

Figure 11:
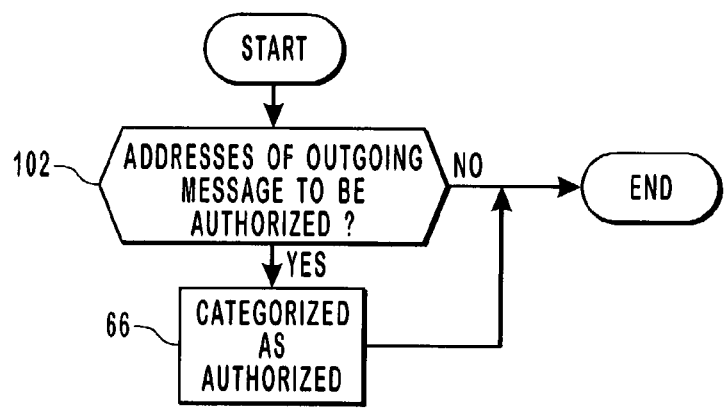
FIG. 11 is a flow diagram illustrating a method for updating the data structure in response to an outgoing electronic message sent by a user of the recipient's computer.

As shown in FIG. 11, an outgoing message 39 initiates outgoing message categorization module 82. At step 102, the system determines whether the recipient wants the address or addresses associated with the outgoing message 39 to be authorized. The recipient may request that this query be performed for each outgoing message. Or, the recipient may desire that all outgoing messages be categorized as authorized in which this step would be bypassed. At step 66, the sender's addresses associated with the outgoing message 39 are categorized as authorized and the data structure 18 modified accordingly.

Another similar method for identifying senders categorized as authorized or unauthorized can be performed when a new subscriber begins receiving the services described herein. A new subscriber typically has an existing mail processor with associated electronic messages that have been stored in various mailboxes or folders. Because outgoing electronic messages stored in an outbox or other folder identify recipients with whom the new subscriber has previously corresponded, these recipients can be automatically categorized as authorized senders. Also, information specifying the actions that the user has performed with respect to the existing electronic messages, such as whether the electronic message has been forwarded, saved, read, etc., can be used as heuristics regarding whether the user perceives the electronic messages as being wanted or unwanted and, consequently, whether the sender's addresses are to be categorized as authorized or unauthorized. Alternatively, the new subscriber can select whether individual recipients of the stored outgoing electronic messages are to be categorized as authorized or unauthorized senders.

Other sources of information identifying individuals with whom the new subscriber has corresponded can also be used. For instance, an integrated or external contact list that is maintained by the new subscriber and identifies e-mail addresses can be used as a source of information for enabling the new subscriber to select authorized or unauthorized recipients. Alternatively, those included in the contacts list can be automatically categorized as authorized senders. Moreover, the use of a contacts list to identify authorized or unauthorized senders can be performed when a new subscriber begins to receive the services described herein or as the subscriber modifies the contacts list at any other time. The act of moving an electronic message from one folder or message box to another can also be used as a heuristic regarding how to categorize the sender. The act of categorizing a sender as unauthorized can also be used to trigger the deletion of any corresponding contact information in a contact list or otherwise marking the contact information in the contact list.

Because there are various actions that can be used to trigger the modification of the category of a sender's address, it can also be useful to track, in the data structure 18, the mechanism by which particular sender's addresses were categorized, such as whether the sender's addresses were obtained from contacts list, existing electronic messages in an inbox, from a response or lack thereof to a request sent from the recipient to the sender, manual selection of the category the recipient, etc. Because the source of the categorization relates to the degree of certainty regarding whether the sender is actually sending wanted or unwanted electronic messages, the source or the categorization can be used to determine when to overrule or change the initial categorization.

VIII. Network Exchange Module

Figure 12:
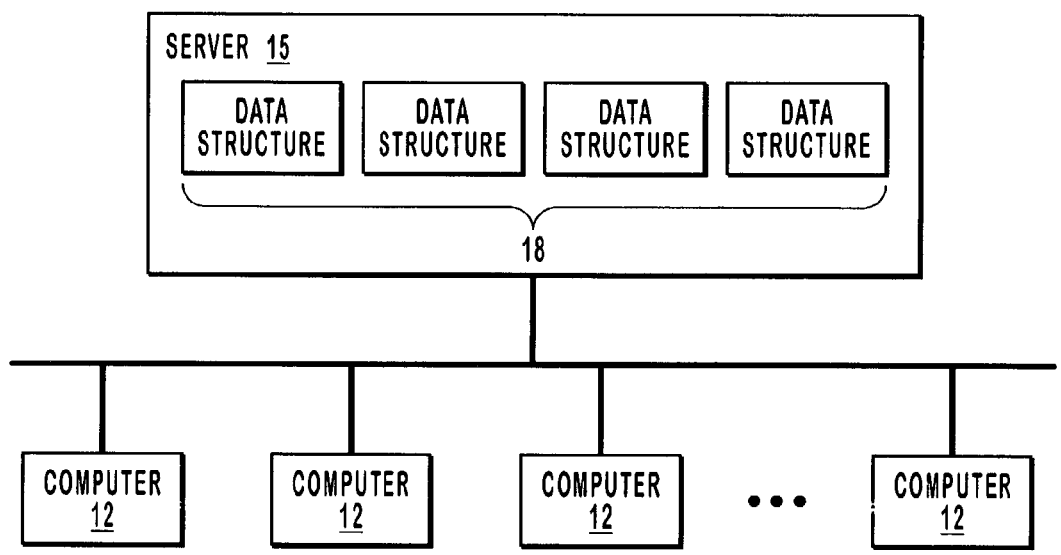
FIG. 12 illustrates a system for propagating information regarding authorized and unauthorized senders throughout a local-area network.

A network exchange module associated with electronic messaging management application 11 provides for exchange of categorization information across computer networks. An exemplary system is a local area network (LAN) 104 shown in FIG. 12. LAN 104 comprises a server 15 hosting a number of client computers 12. The electronic messaging management application 11 and data structure 18 are maintained either on server 15 or on the client computers 12. In one embodiment, all recipients share the same data structure 18 stored at server 15. In another embodiment, each client computer 12 has its own data structure 18 which it can access through server 15. Where recipients have separate data structures 18, the recipients of LAN 104 may choose to share information located in their individual data structures 18. That is, where a sender's address is categorized as authorized, unauthorized, or unconfirmed for one recipient, the same data structure 18 may be propagated to all recipients in LAN 104. Alternatively, only authorized and unauthorized sender's addresses may be propagated through the network.

In one embodiment, the volume of categorization data sent between servers or client computers can be reduced by following a protocol that focuses on sender's addresses that are initially unconfirmed. This method includes identifying sender's addresses that are initially unconfirmed according to a data structure associated with one of the recipients. The client computer or server that maintains the data structure can then send requests for further data regarding the unconfirmed sender to other servers or client computer in an attempt to determine whether the same sender has been categorized as authorized or unauthorized elsewhere in the network. The other servers or client computers receiving the request for information regarding the unconfirmed sender can respond in the event that they include information categorizing the sender as either authorized or authorized. In this manner, the computers in the network that maintain the data structures for recipients communicate with each other in the event that there is an unconfirmed sender. In other words, network traffic associated with the categorization of senders is transmitted in response to the need to confirm the authorization of a particular sender for a particular recipient. This avoids the significantly larger volume of network traffic that would be likely to be generated in an alternative embodiment, in which entire data structures representing the categorization of senders are periodically transmitted between multiple computers on the network or in which the information is transmitted each time a sender is categorized as authorized or unauthorized. These methods and principles are also applicable to the server exchange features of the invention described below in Section IX.

Regardless of the protocol that is used or the nature of the events that trigger the exchange of categorization information, a variety of different network architectures and topologies can be used. Moreover, in one embodiment, categorization information is exchanged between all users of the network. In another embodiment, users can select a group of users to share information about data structures 18.

IX. Server Exchange Module

Figure 13:
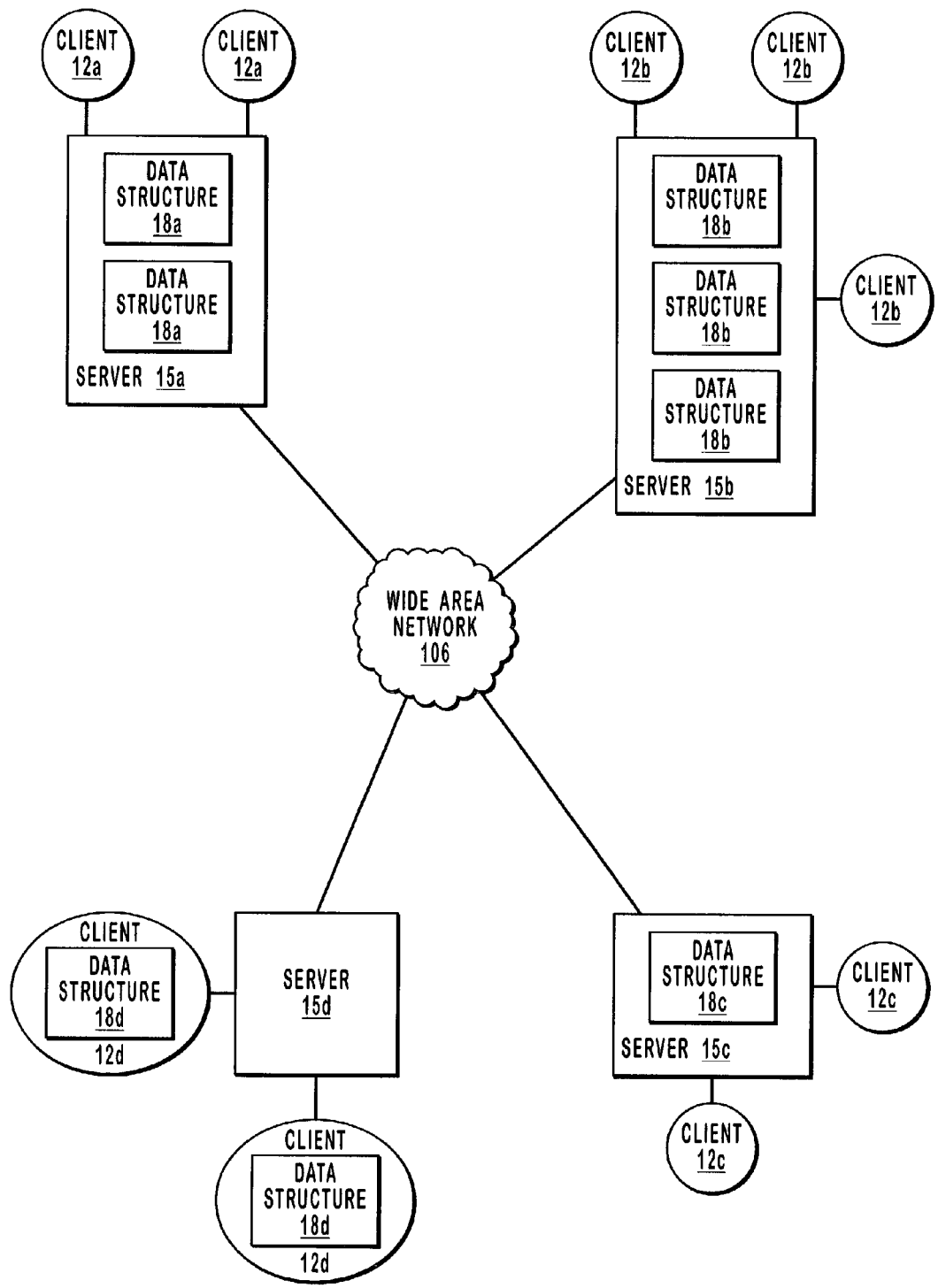
FIG. 13 illustrates a system for propagating information regarding authorized and unauthorized senders throughout the Internet or another wide-area network.

The server exchange module 86 allows for exchange of categorization information across servers. FIG. 13 shows an exemplary system for server exchange. As depicted in FIG. 13, a number of servers 15 are connected to a wide area network (WAN) 106 (e.g., the Internet). In addition, each server 15 is connected to one or more client computers 12 which it hosts. Electronic messaging management application 11 and data structure 18 may be located on servers 15 or locally on client computers 12. In either embodiment, information from data structures 18 may be propagated from one server 15 to other servers and, if necessary, to or from client computers 12. A peer-to-peer propagation may be utilized in which information is exchanged directly from client computer 12 to client computer 12 or from server 14 to server 14 regardless of any particular hierarchy. Alternatively, a hierarchical propagation may be used to exchange information across servers 14.

FIG. 13 further illustrates various examples of the storage and maintenance of data structures 18 for the clients 12 associated with servers 15. For instance, servers 15a and 15b have one data structure 18a, 18b for each of the associated clients 12a and 12b, respectively. Server 15c has one data structure 18c that is shared by multiple clients 12c. Clients 12d store and maintain their own data structures 18d rather than relying on server 15d for this service. While propagation of the information of the data structures 18 is generally less complex when the servers 15 store and maintain the data structures 18, the propagation of this information is possible in any of these server/client configurations.

X. Contact Management Module

Figure 14:
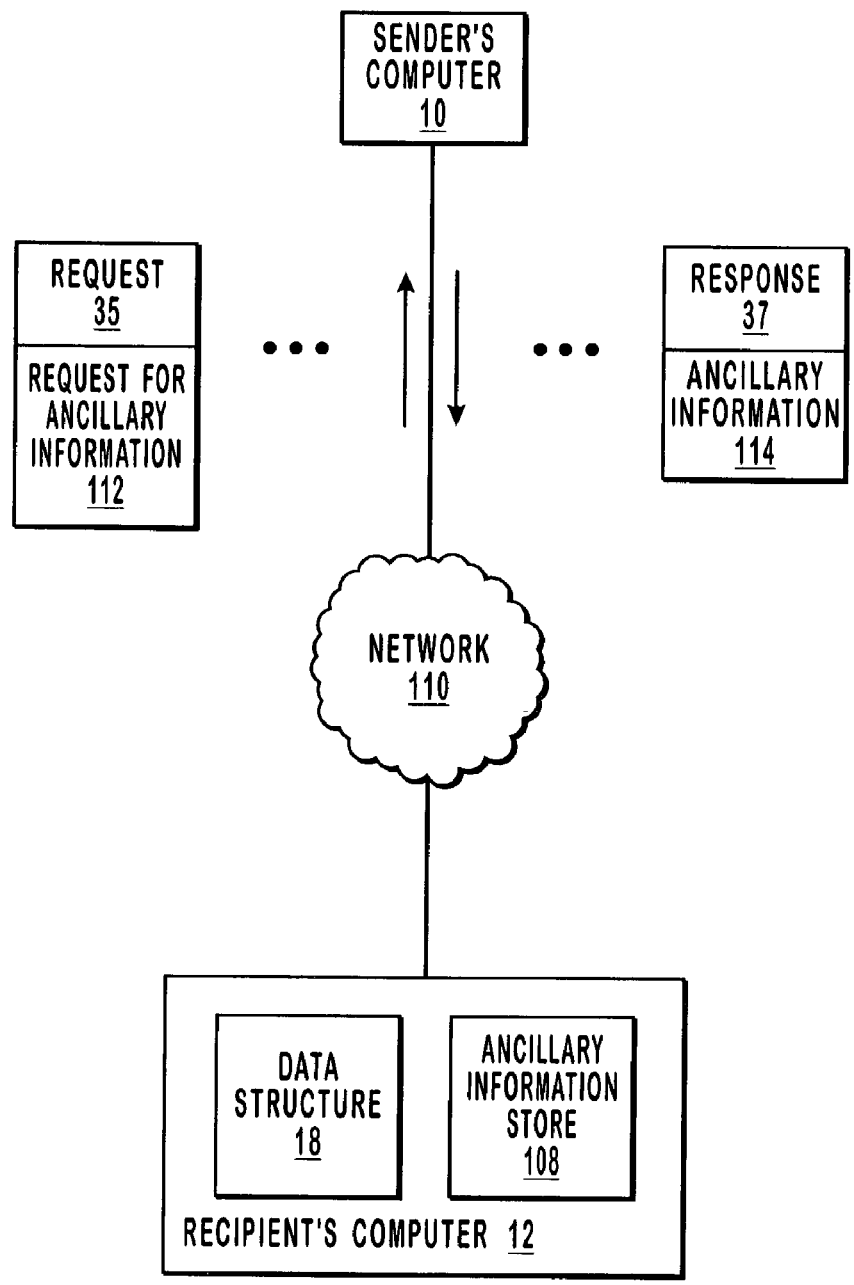
FIG. 14 illustrates a system and method for obtaining contact or other information from the sender during the categorization process.

A contact management module associated with electronic messaging management application 11 allows for ancillary information to be obtained during the request/response protocol of categorization module 26. This process enhances the value of the request/response protocol for both the sender and recipient and increases the likelihood that the sender will provide a response to the request. Ancillary information may include contact information such as name, address, phone numbers, fax numbers, website addresses, and the like. As shown in FIG. 14, a sender's computer 10 and a recipient's computer 12 are connected through a network 110. As discussed above, during the request/response protocol of categorization module 26, a request 35 is sent to receive a response 37 that must be answered by receiving input from a human. The contact management module modifies the request 35 to include a request for ancillary information 112. Any response 37 provided in response to request 35 then contains a response with ancillary information 114.

In one embodiment, the sender does not have to respond to the request for ancillary information 112 so long as the response 37 to the request 35 itself is timely and accurate. In this embodiment, the contact management module acts as a facilitator for collecting contact information (instead of the recipient having to contact the sender). When data structure 18 is updated with the categorization from the request/response protocol, the ancillary information 114 is also stored in an ancillary information store 108 at the recipient computer 12 or at a server associated with the recipient computer, or can be exported or synchronized with external contact management applications. Furthermore, in the event that a valid response containing contact information is received from the sender, the recipient's contact information can be automatically transmitted in an electronic message to the sender, further providing an incentive to the sender to respond to the request from the recipient.

XI. Application Architecture and Exemplary Computing Environment

The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 15:
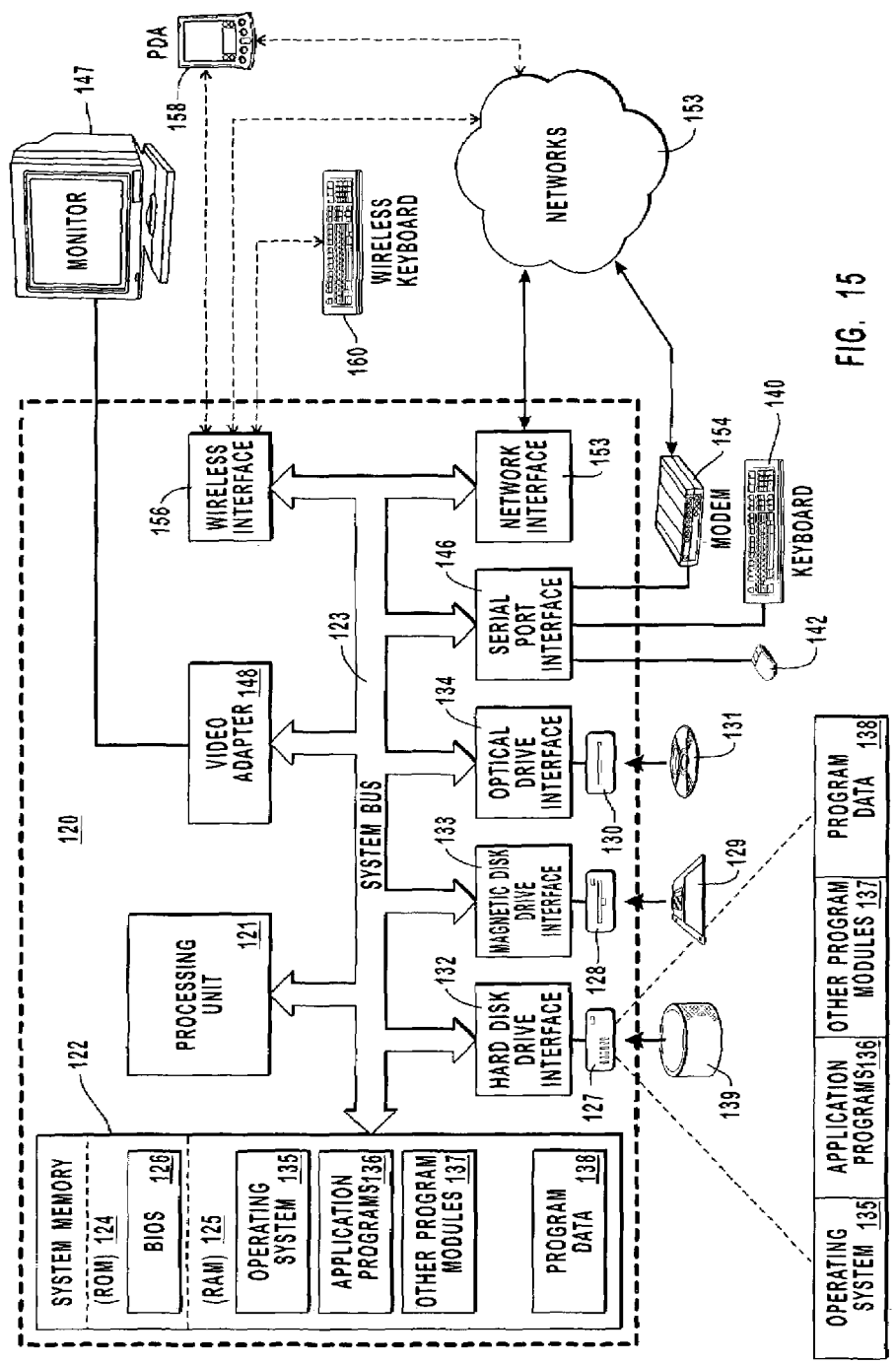
FIG. 15 illustrates an exemplary processing system that can be used to implement the invention.

FIG. 15 and the following discussion are intended to provide a brief, general description of a suitable computing environment in which the invention may be implemented. Although not required, the invention has been described herein in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote data storage devices.

With reference to FIG. 15, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A recipient may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment generally indicated at 153 using logical connections to one or more remote computers as described above with reference to FIGS. 1, 3C, 12, 13, and 14. The logical connections referred to in FIG. 15 include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. In a network system for managing electronic messages for users, the network system having multiple computers that receive incoming electronic messages, a method for managing a data structure that is used to filter incoming electronic messages, comprising the acts of:

at a first client computer, receiving an incoming electronic message that includes a sender's address and is addressed to a first user of the first client computer of the network system;

using an electronic messaging management application having a filtering module and a categorization module, the electronic messaging management application located at the first client computer, categorizing the sender's address as being authorized for sending electronic messages to the first user of the first client computer, unauthorized for sending electronic messages to the first user of the first client computer, or unconfirmed as to whether the sender's address is authorized or unauthorized for sending electronic messages to the first user of the first client computer; and propagating a categorization of the sender's address specific to the first user of the first client computer to a second client computer of the network system, such that the sender's address is also categorized as being authorized, unauthorized, or unconfirmed with respect to the second client computer, wherein electronic messages directed to a second user of the second client computer are delivered to the second user based on the propagated categorization of the sender's address, wherein propagating the categorization of the sender's address from the first client computer to the second client computer occurs in response to a request from an electronic messaging management application located at the second client computer.

2. The method as recited in claim 1, wherein the act of categorizing the sender's address further comprises the acts of:
   sending a request to the sender's address, wherein the request is to be answered only by receiving input from a person;
   categorizing the sender's address as being authorized if a correct response is received within a predetermined period of time;
   categorizing the sender's address as being unauthorized if an incorrect response is received within a predetermined period of time;
   categorizing the sender's address as being unconfirmed if no response to the request is received within a predetermined period of time; and
   according to the categorization of the sender's address, modifying a data structure in which the categorization of sender's addresses is maintained.

3. The method as recited in claim 1, wherein the act of propagating the categorization of the sender's address comprises the act of propagating the categorization of the sender's address from a data structure maintained at the first client computer to data structures that are remote with respect to the first client computer.

4. The method as recited in claim 3, wherein the data structures that are remote with respect to the first computer are maintained at other client computers of the network system.

5. The method as recited in claim 3, wherein the data structures that are remote with respect to the first computer are maintained at one or more server computer associated with the other client computers.

6. The method as recited in claim 1, wherein the act of propagating the categorization of the sender's address comprises the act of propagating the categorization of the sender's addresses from a data structure that is associated with the first user of the first client computer and is maintained at a server computer to other data structures that are associated with users of other client computers and are also maintained at said server computer.

7. The method as recited in claim 1, wherein the act of propagating the categorization of the sender's address comprises the act of propagating the categorization of the sender's address from a data structure that is maintained at a first server computer associated with the first client computer to data structures that are maintained by one or more other server computers that are associated with other client computers.

8. The method as recited in claim 7, wherein the act of propagating the categorization of the sender's address from the data structure that is maintained at the first server computer comprises the act of peer-to-peer propagation of the categorization of the sender's address from the first server computer to said one or more other server computers.

9. The method as recited in claim 7, wherein the act of propagating the categorization of the sender's address from the data structure that is maintained at the first server computer comprises the act of hierarchical propagation of the categorization of the sender's address through a hierarchy of servers between the first server and said one or more other server computers.

10. The method as recited in claim 1, wherein the act of propagating the categorization of the sender's address comprises the act of propagating the categorization of the sender's address from a data structure that is maintained at a first server computer associated with the first client computer to data structures that are maintained at other client computers of the network system.

11. The method as recited in claim 1, further comprising the act of receiving an incoming electronic message addressed to the first user of the first computer and filtering the electronic message based on a categorization of a sender's address included in the incoming electronic message.

12. The method as recited in claim 1, wherein the act of propagating the categorization of the sender's address comprises the act of, in response to the sender's address being categorized as being unconfirmed, sending a request to computers that maintain data structures categorizing sender's addresses with respect to other users, so as to request information as to whether the sender's address has been categorized as being authorized or unauthorized with respect to the other users.

13. In a network system for managing electronic messages for users, the network system having multiple client computers that receive incoming electronic messages, a method for managing a data structure that is used to filter incoming electronic messages, comprising, at a first client computer, the acts of:
   receiving an incoming electronic message that includes a sender's address and is addressed to a first user of a first client computer;
   using an electronic messaging management application having a filtering module and a categorization module, the electronic messaging management application located at the first client computer, categorizing the sender's address as being unconfirmed as to whether the sender's address is authorized or unauthorized for sending electronic messages to an inbox located on the first client computer;
   sending a request to a second client computer to determine whether the sender's address has been categorized by the second client computer as authorized, unauthorized or unconfirmed, the second client computer including an electronic messaging management application having a filtering module and a categorization module;
   receiving a response from the second client computer containing information regarding a categorization of the sender's address; and
   directing the incoming electronic message to the inbox located on the first client computer only if the response from the second client computer indicates that the second client computer categorized the sender's address as authorized.

14. The method as recited in claim 13, further comprising categorizing the sender's address as being authorized if the response indicates that the second client computer categorized the sender's address as authorized.

15. The method as recited in claim 13, further comprising categorizing the sender's address as being unauthorized if the response indicates that the second client computer categorized the sender's address as unauthorized.

16. The method as recited in claim 13, further comprising, upon determining that the response indicates that the second client computer categorized the sender's address as unconfirmed, the acts of:
   sending a request to the sender's address, wherein the request is to be answered only by receiving input from a person;
   categorizing the sender's address as being authorized if a correct response is received within a predetermined period of time;

categorizing the sender's address as being unauthorized if an incorrect response is received within a predetermined period of time;

categorizing the sender's address as being unconfirmed if no response to the request is received within a predetermined period of time; and according to a categorization of the sender's address, modifying a data structure in which the categorization of sender's addresses is maintained.

17. In a network system for managing electronic messages for users, the network system having multiple client computers that receive incoming electronic messages through a messaging server, a method for managing a data structure that is used to filter incoming electronic messages at a messaging server, comprising the acts of:

receiving an incoming electronic message that includes a sender's address and is addressed to a first user of a first client computer of the network system;

sending the incoming electronic message to the first client computer of the network system such that the first client computer can use an electronic messaging management application having a filtering module and a categorization module located thereon to determine whether the sender's address is unconfirmed for sending electronic messages to an inbox located on the first client computer;

receiving a request from the first client computer requesting whether the sender's address is categorized as authorized on a second client computer of the network system;

obtaining information regarding whether the sender's address is categorized as authorized by the second client computer on the network system, the second client computer also having an electronic messaging management application having a filtering module and a categorization module; and sending a response to the first client computer containing information that the sender's address is categorized as authorized by the second client computer on the network system.

18. The method as recited in claim 17, wherein obtaining information regarding whether the sender's address is categorized as authorized by the second client computer on the network system comprises sending a request to the second client computer of the network system requesting whether the sender's address is categorized as authorized at the second client computer.

19. The method as recited in claim 17, wherein obtaining information regarding whether the sender's address is categorized as authorized by the second client computer on the network system comprises accessing a database stored at the server containing categorization information for the second client computer.

20. The method as recited in claim 17, further comprising updating a data structure maintained at the messaging server with a categorization of the sender's address as being authorized specific to the first user of the first client computer.

* * * * *